US008106909B2

(12) United States Patent
McDowell

(10) Patent No.: US 8,106,909 B2
(45) Date of Patent: *Jan. 31, 2012

(54) COMMON KEY FRAME CACHING FOR A REMOTE USER INTERFACE

(75) Inventor: Brian McDowell, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 767 days.

This patent is subject to a terminal disclaimer.

(21) Appl. No.: 11/872,004

(22) Filed: Oct. 13, 2007

(65) Prior Publication Data

US 2009/0100483 A1 Apr. 16, 2009

(51) Int. Cl.
*G06T 13/00* (2011.01)
(52) U.S. Cl. ........ 345/473; 382/162; 382/232; 382/236; 709/205; 709/217; 709/219; 709/248; 725/109
(58) Field of Classification Search .................. 345/473; 382/232, 236, 162; 348/E5.006, E5.008, 348/E7.056; 375/E7.263; 709/205, 217, 709/219, 248; 725/109
See application file for complete search history.

(56) References Cited

U.S. PATENT DOCUMENTS

| 5,379,071 | A | 1/1995 | Parikh et al. |
| 5,488,430 | A | 1/1996 | Hong |
| 5,872,604 | A | 2/1999 | Ogura |
| 6,035,324 | A | 3/2000 | Chang et al. |
| 6,037,986 | A | 3/2000 | Zhang et al. |
| 6,185,625 | B1 | 2/2001 | Tso et al. |
| 6,298,144 | B1 | 10/2001 | Pucker, II et al. |
| 6,298,370 | B1 * | 10/2001 | Tang et al. ..................... 718/102 |
| 6,327,608 | B1 | 12/2001 | Dillingham |
| 6,452,972 | B1 | 9/2002 | Ohara |
| 6,678,332 | B1 * | 1/2004 | Gardere et al. .......... 375/240.26 |
| 6,766,352 | B1 | 7/2004 | McBrearty et al. |
| 6,809,758 | B1 | 10/2004 | Jones |
| 7,027,615 | B2 | 4/2006 | Chen |
| 7,089,284 | B2 | 8/2006 | Pardikar et al. |
| 7,111,060 | B2 | 9/2006 | Araujo et al. |
| 7,155,676 | B2 * | 12/2006 | Land et al. ..................... 715/731 |

(Continued)

OTHER PUBLICATIONS

Alexander Ya-Li Wong, Operating System Support for Multi-User, Remote, Graphical Interaction, Proceedings of the 2000 USENIX Annual Technical Conference, Jun. 18-23, 2000, pp. 16-16, USENIX Association, Berkeley, CA, USA.

(Continued)

*Primary Examiner* — Kimbinh T Nguyen
(74) *Attorney, Agent, or Firm* — Vierra Magen Marcus & DeNiro LLP

(57) ABSTRACT

Common key frames are provided to a client during initialization to provide more efficient remoting of user interface graphical information. By storing the common key frames at the client, the common key frames may be loaded quicker and more efficiently at the client without having to resend graphical information for each common key frame each time a common key frame is used to provide a new frame. Differences between a selected common key frame and the new frame are encoded as delta commands. A payload containing a common key frame command, which identifies a common key frame at the client, and delta commands which encode differences between the selected common key frame and new frame is sent to the client. The client receives the payload, sets a cached common key frame as the current frame, applies the delta commands to the selected common key frame, and renders the new frame.

20 Claims, 25 Drawing Sheets

U.S. PATENT DOCUMENTS

| | | | |
|---|---|---|---|
| 7,360,162 B2 * | 4/2008 | Shaw et al. | 715/744 |
| 7,415,670 B2 | 8/2008 | Hull et al. | |
| 7,634,230 B2 * | 12/2009 | Ji et al. | 455/41.2 |
| 7,672,005 B1 * | 3/2010 | Hobbs et al. | 358/1.15 |
| 7,770,008 B2 * | 8/2010 | Walmsley | 713/170 |
| 2002/0129096 A1 | 9/2002 | Mansour et al. | |
| 2002/0147750 A1 | 10/2002 | Kumhyr et al. | |
| 2003/0234811 A1 | 12/2003 | Kim | |
| 2004/0015981 A1 | 1/2004 | Coker et al. | |
| 2004/0036711 A1 | 2/2004 | Anderson | |
| 2004/0064518 A1 | 4/2004 | Almstrand et al. | |
| 2004/0183756 A1 | 9/2004 | Freitas et al. | |
| 2004/0184534 A1 | 9/2004 | Wang | |
| 2004/0189689 A1 | 9/2004 | Barrett | |
| 2004/0221004 A1 | 11/2004 | Chalfin et al. | |
| 2004/0239681 A1 | 12/2004 | Robotham et al. | |
| 2005/0071759 A1 | 3/2005 | Connors et al. | |
| 2005/0283798 A1 | 12/2005 | Hunleth et al. | |
| 2006/0080382 A1 | 4/2006 | Dutta et al. | |
| 2006/0146059 A1 | 7/2006 | Inoue et al. | |
| 2006/0158524 A1 | 7/2006 | Yang et al. | |
| 2006/0174026 A1 | 8/2006 | Robinson et al. | |
| 2006/0179118 A1 | 8/2006 | Stirbu | |
| 2006/0209961 A1 | 9/2006 | Han et al. | |
| 2007/0110160 A1 | 5/2007 | Wang et al. | |
| 2007/0198656 A1 * | 8/2007 | Mazzaferri et al. | 709/218 |
| 2007/0296721 A1 | 12/2007 | Chang et al. | |
| 2008/0126812 A1 * | 5/2008 | Ahmed et al. | 713/189 |
| 2008/0310734 A1 | 12/2008 | Ahammad et al. | |
| 2010/0103953 A1 * | 4/2010 | Matias et al. | 370/477 |

OTHER PUBLICATIONS

S. Jae Yang, The Performance of Remote Display Mechanisms for Thin-Client Computing, Proceedings of the 2002 USENIX Annual Technical Conference, Jun. 2002, pp. 131-146, USENIX Association, Berkeley, CA, USA.

Qiang Liu, New Change Detection Models for Object-Based Encoding of Patient Monitoring Video, 2005, University of Pittsburgh, School of Engineering.

Jun-Ren Ding, Motion-based Adaptive GOP Algorithms for Efficient H.264/AVC Compression, JCIS-2006 Proceedings, Part of Series: Advances in Intelligent Systems Research, Oct. 2006.

David J. Fleet, Design and Use of Linear Models for Image Motion Analysis, International Journal of Computer Vision, 2000, pp. 171-193, vol. 36 Issue 3, Kluwer Academic Publishers, Hingham, MA, USA.

Gehner, Proposal for Rich Server Platform-User Interface Framework (RSP-UI), Copyright 2007 The Eclipse Foundation, http://www.eclipse.org/proposals/rsp/.

Gottfried Zimmermann, Universal Remote Console-Prototyping for the Alternate Interface Access Standard, Universal Access, Theoretical Perspectives, Practice and Experience, 7th ERCIM International Workshop on User Interfaces, 2003.

Turaga, Estimation and Mode Decision for Spatially Correlated Motion Sequences, IEEE Transactions on Circuits and Systems for Video Technology, vol. 11, No. 10, pp. 1098-1107, Oct. 2001.

Kauff et al., Fast Motion Estimation for Real-Time Shape-Adaptive MPEG-4 Video Encoding, Proc. of ACM Multimedia 2000 Workshops, pp. 55-58, Los Angeles, USA, Nov. 2000, http://ip.hhi.de/imedia_G3/assets/pdfs/ACM00.pdf.

Office Action dated Feb. 15, 2001, U.S. Appl. No. 11/860,008, filed Sep. 24, 2007.

Office Action dated Jun. 28, 2011, U.S. Appl. No. 11/871,719, filed Oct. 12, 2007, 24 pages.

Response to Office Action dated Jul. 21, 2011, U.S. Appl. No. 11/860,008, filed Sep. 24, 2007, 9 pages.

Deb et al., "RepVis: A Remote Visualization System for Large Environments", In proceedings of Workshop on Computer Graphics, Vision and Image Processing, Feb. 21-22, 2004, IIT Bombay, India, 4 pages.

Olson et al., "Remote Rendering Using Vtk and Vic," Argonne National Lab, Sep. 19, 2000, retrieved from the Internet: <URL:http://www.osti.gov/bridge/servlets/purl/764263-Hygv8Y/webviewable/764263.pdf>, 4 pages.

Dawson et al., "Optimal Parallel MPEG Encoding," Computer Science Technical Report, Cornell University, May 1996 [retrieved on Jun. 13, 2007] Retrieved from the Internet: <URL:http://www.cs.cornell.edu/Info/Projects/zeno/Projects/OPME/opme.report.html>, 7 pages.

Response to Office Action Restriction dated Jun. 7, 2011, U.S. Appl. No. 11/871,719, filed Oct. 12, 2007.

Office Action dated May 11, 2011, U.S. Appl. No. 11/860,008, filed Sep. 24, 2007.

Office Action dated May 20, 2011, U.S. Appl. No. 11/871,719, filed Oct. 12, 2007.

Response A to Office Action dated Mar. 1, 2011, U.S. Appl. No. 11/860,008, filed Sep. 24, 2007.

* cited by examiner

Figure 1B — Current frame
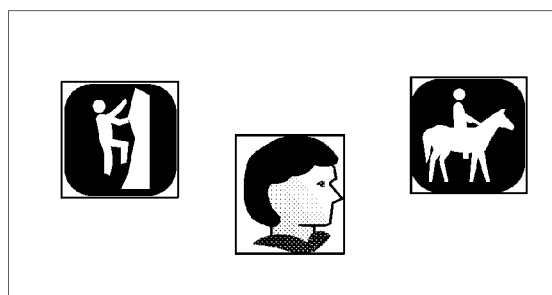
Figure 1C — New frame
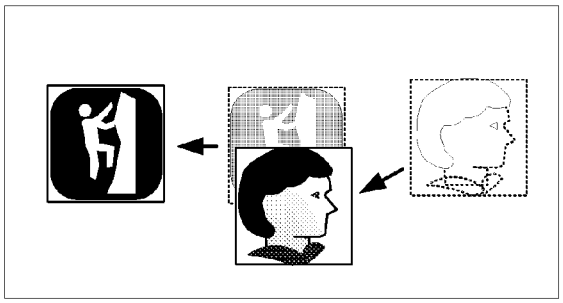
Figure 1D — Move commands generated for shapes determined to move between a current image and a new image
Figure 1E — Delta determined between current frame (after move commands) and new frame

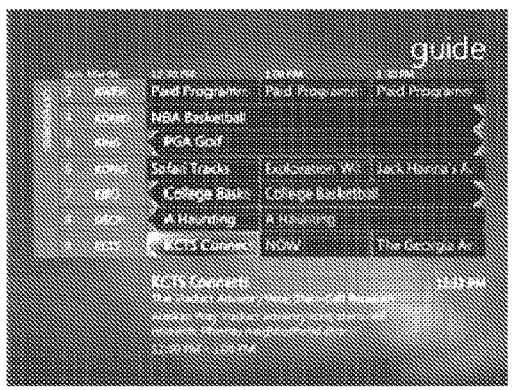
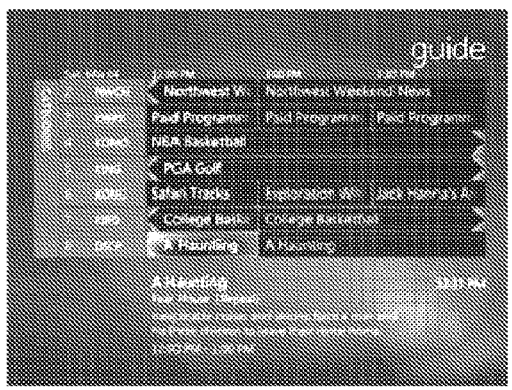
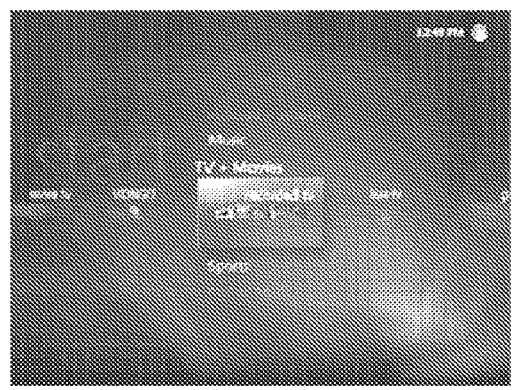
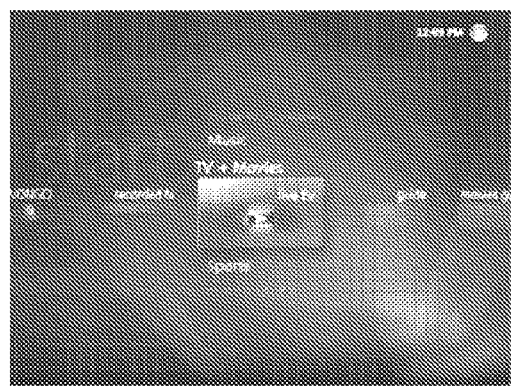
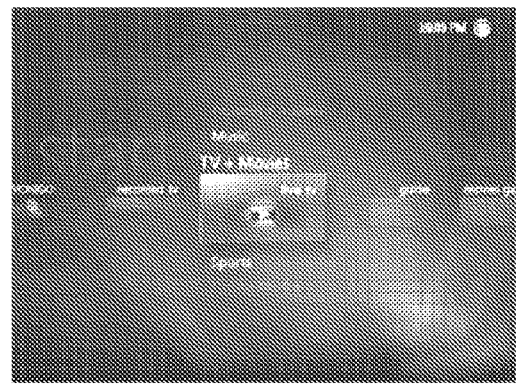
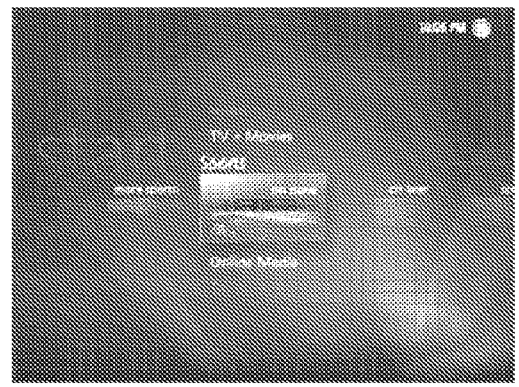
Current frames　　　　　　　　　　New frames
Figure 1F　　　　　　　　　　Figure 1G

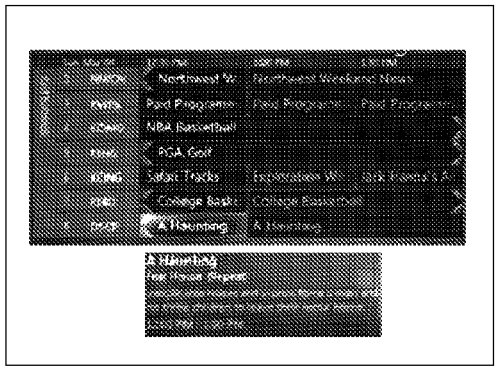
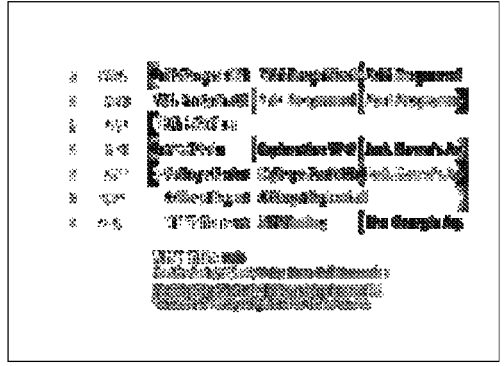
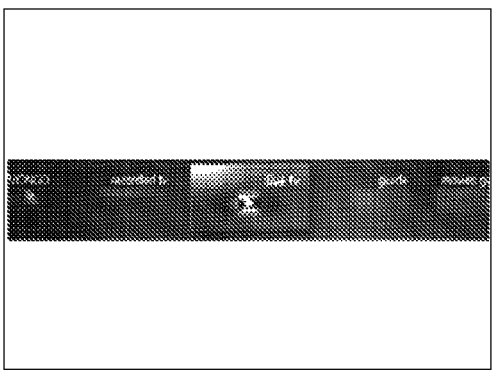
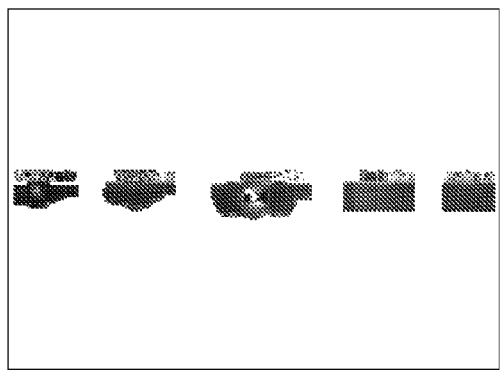
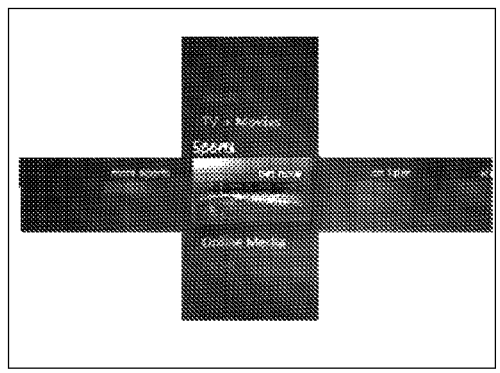
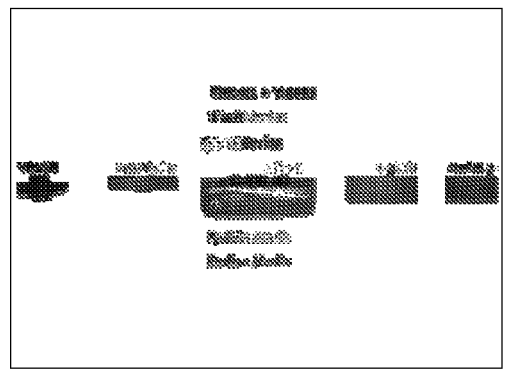
Dirty rectangle encoding        Delta encoding
Figure 1H        Figure 1I Current frame with motion destination (S)

New Frame with motion source (D)

Current frame with motion Destination (D')

New frame with motion source (S')

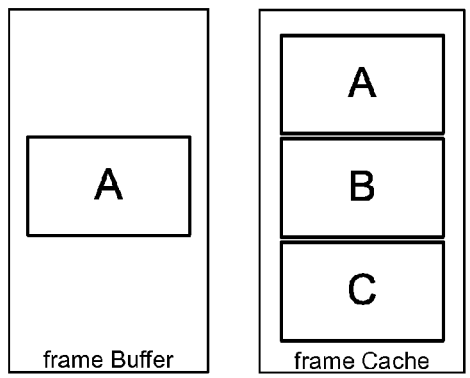 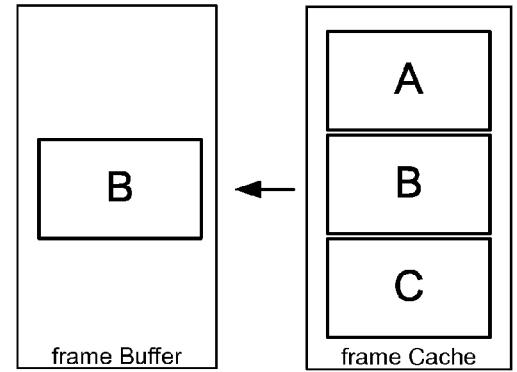
Figure 15A  Figure 15B
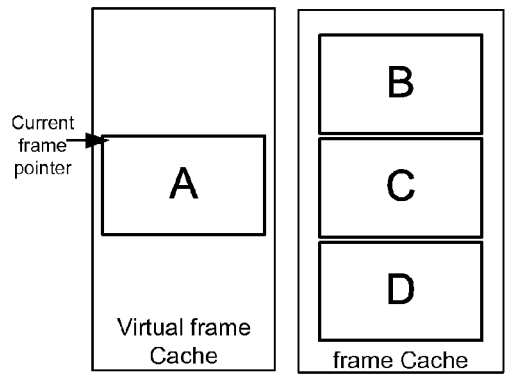 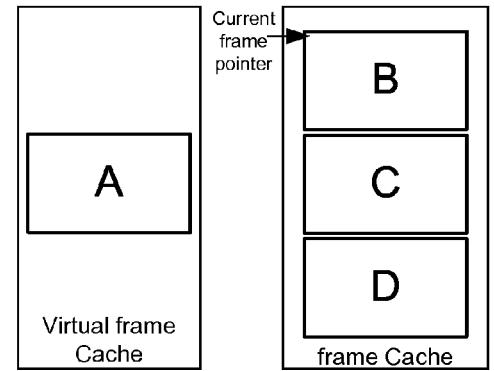
Figure 16A  Figure 16B

COMMON KEY FRAME CACHING FOR A REMOTE USER INTERFACE

BACKGROUND

Existing network services provide remoting to a thin client, very thin client or other machine having limited resources. In client/server applications using a thin client, the client is designed to be especially small so that the bulk of the data processing occurs on the server. For example, remoting to a client may provide interface graphical data to a thin client which is a low-cost, centrally-managed computer usually devoid of CD-ROM players, diskette drives, and expansion slot. A remote session allows a user to login to a server through the thin client. For example, a server may provide user interface graphics to render at the client in response to user input received at the client and provided to the server.

The efficiency of previous remoting methods used for remote sessions for thin clients does not provide a viable solution to remoting issues involved with rich interfaces. In particular, when remoting a user interface with rich graphics to a thin client, previous remoting methods do not process updates to a user interface with the speed and performance that users have come to expect from modern network services. Even on a very capable client, the richness of an "entertainment centric" user interface does not correlate to efficient remoting. For example, with a normal desktop user interface, a simple command to fill a rectangle in the user interface frame can be sent to fill the background white before text is rendered using basic glyphs. However, if the user interface is a richly rendered UI with the background generated by a designer using a drawing program, photo-realistic frame and text that is anti-aliased using advanced rendering techniques to blend with that background, there are no simple commands which can be remoted to the client to achieve the resulting graphics in the frame. As a result, the frame data itself must be sent to the client. Even with modern bulk compression techniques, transmitting bitmapped graphics for a user interface frame can be expensive in terms of network bandwidth and client processing resources.

SUMMARY

A set of common key frames are provided to a client during initialization to provide more efficient remoting of user interface graphical information at the client. By storing the common key frames at the client, the common key frames can be loaded more quickly at the client without having to resend the graphical information for each common key frame each time the frames are presented as part of a new frame. Differences between the selected common key frame and the new frame are encoded as delta commands and added to a payload.

The payload is sent to the client by the server and contains a common key frame command that identifies a client common key frame and delta commands which encode differences between the selected common key frame and new frame. The client receives the payload, sets the common key frame as the new frame identified in the common key frame command, applies delta commands to the selected common key frame, and renders the new frame.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 1B is an example of a current frame rendered in a user interface.

FIG. 1C is an example of a new frame rendered in a user interface.

FIG. 1D is an example of how move commands are applied to a frame.

FIG. 1E is an example of a difference frame is derived from a current frame and a new frame.

FIG. 1F shows 3 examples of user interface current frames.

FIG. 1G shows 3 examples of user interface new frames.

FIG. 1H shows 3 graphical representations of dirty rectangle payloads.

FIG. 1I shows 3 graphical representations of delta encoded payloads.

FIGS. 15A and 15B are examples of managing a frame buffer with a frame cache.

FIGS. 16A and 16B are examples of managing a frame buffer used as a virtual frame cache and a frame cache.

DETAILED DESCRIPTION

Figure 1A:
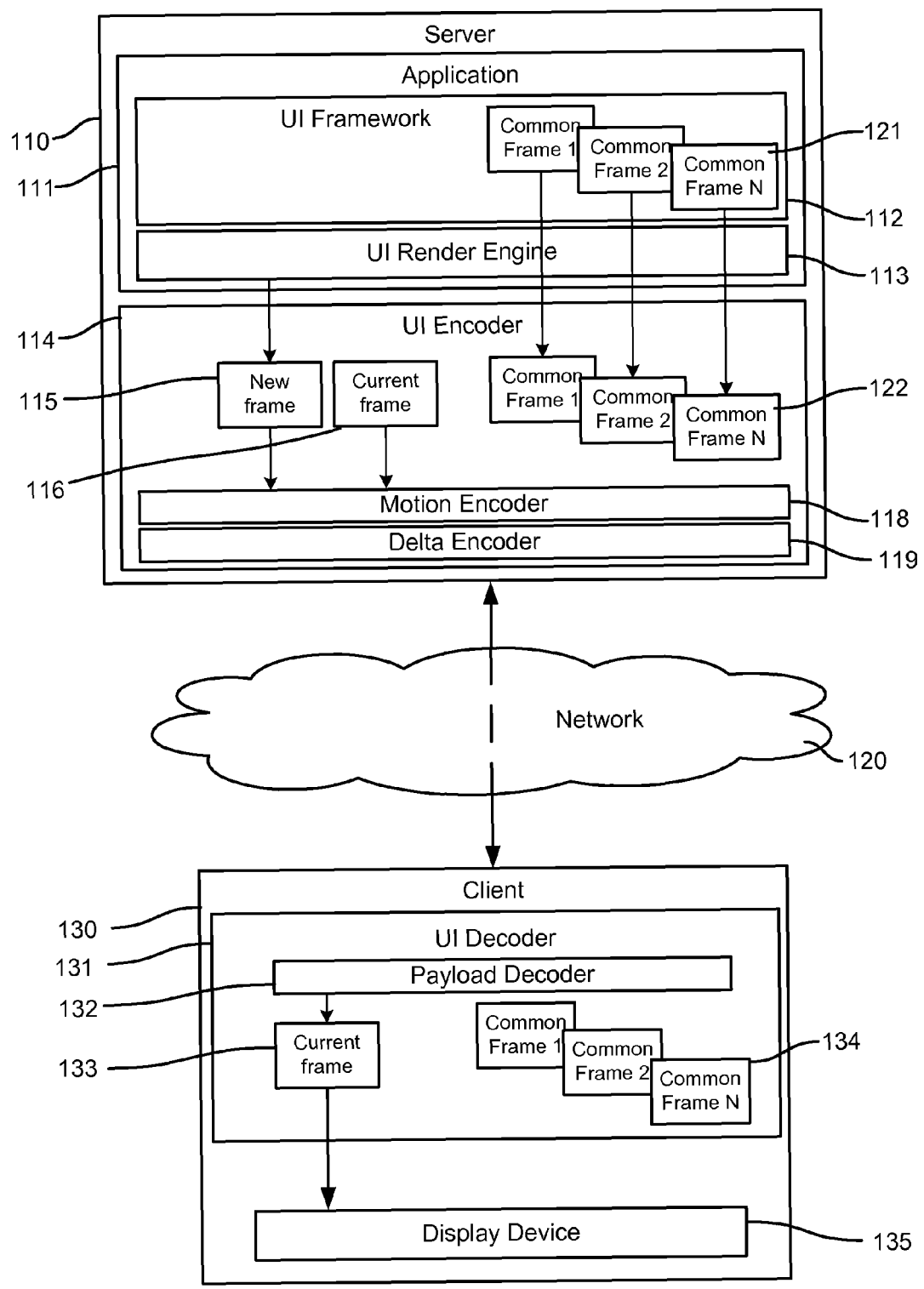
FIG. 1A is a block diagram of an embodiment of a system for remoting a user interface.

Graphical data is encoded for remoting user interfaces in real time between a server host and client over a network. The server provides graphical interface data to the thin client. The graphical data is rendered at the client and comprises a current frame. The client transmits user input to the server and the server determines whether the input causes a change in the user interface graphics. The graphics change may result in a frame of data to be rendered and remoted to the client. Remoting the interface graphics may include one or more of performing caching logic, motion encoding and delta encoding with respect to the current frame presented by the client and a new frame rendered as a result of the user input. Cache frame commands, motion commands and delta encode commands are embedded in a payload and sent to a thin client. The thin client receives the payload, decodes and parses the payload, and performs commands contained in the payload to the current active frame cache on the client to render the new frame of frame data.

In some embodiments, remoting a user interface for a client may include implementing a common key frame caching methodology to provide encoded interface graphics at the client. The common key frame caching may include providing the client with one or more common key frames to cache at initialization of a client user interface (UI) decoder (or at some other point early in the connection timeline between the server/host and the client). Once the common key frames are cached, an encoder at the server may select one of the cached common key frames to set as the current frame upon detecting a frame update event. Selection of the cached common key frame may be based on identification of the common key frame by a rendering engine that generates the new frame or based on some other source. Upon selecting a common key frame, a command is generated to set the corresponding common key frame cache ID at the client, the command is added to a payload, the common key frame is selected and moved to a current frame buffer at the server, delta (difference) encoding is performed to generate delta encode commands, and the common key frame commands, delta encode commands, and optionally other data is transmitted as part of one or more payloads to a client.

Overview of Encoding and Remote Rendering

Upon determining a user interface state change has occurred, through user interaction or other event, the server generates a new user interface frame. The new frame is to replace a current frame provided by the client as a result of the user interface state change. In some embodiments, the server provides a list of rectangles that indicate areas of the frame where changes have occurred since the last frame, the rectangles indicating areas of the last frame which are no longer valid. In some embodiments, the server identifies frame objects that move from a first position in the current frame to a second position in the new frame rendered by a render engine. A motion hint and other graphical data can be created for each moving object. Collision detection and other motion hint reducing techniques can be performed to reduce the number of hints for a frame update. The collision detection process detects and prevents motion hint from overwriting each other. The reduced set of motion hints is used to generate motion commands that are applied to a copy of the current frame maintained on the server. The server then determines the differences between the modified current frame and the new frame and encodes the difference as difference or "delta" data to a payload, using the provided invalidation rectangles to reduce the search area for possible "delta" data between the frames.

Once the delta encoding is complete, the server sends the encoded non-colliding motion commands, delta commands and other commands to the thin client. The thin client receives the commands and the difference data, applies the motion commands first and then the delta commands to the current frame. As a result, the client processes the current frame to match the new frame reflecting the changed user interface state.

In some embodiments, the present technology may also utilize frame caching to efficiently render a frame at a client. A server may instruct a client to cache frames of data determined to be the most relevant rendered frames. When sending a user interface frame update to a client, a server may determine whether or not the new interface frame matches a cached frame using a similarity threshold comparison. If the new frame matches a cached frame within a determined threshold, the server sends instructions to the client to load or select the matching cached frame rather than send frame data for the new frame over the network the client. The new frame is then differenced against the selected current cache frame by the server and the encoded delta commands are sent in the same payload as the cache command. If the new frame does not match a cached frame, the server selects the least relevant cache frame based on some criteria. Based on the criteria, the selected cache frame is replaced with the new frame data and selected as the current active cache frame.

Remote Rendering System

FIG. 1A is a block diagram of an embodiment of a system for remotely rendering a user interface. The system of FIG. 1A includes server 110, network 120 and client 130. Server 110 includes application 111 and UI encoder 114. Application 111 includes UI framework 112 and UI render engine 113. UI framework includes common key frames 1, 2, and so for forth up to N common key frames, collectively represented as common frames 121. The common key frames may be backgrounds or other frames of graphical data that the UI framework uses to generate a frame for a user interface. When generating a new frame, UI framework 112 provides information identifying the common key frame used in the new frame to UI render engine 113 which passes the information to UI encoder 114. UI render engine 113 renders graphical data for a user interface, including a new frame, dirty rectangles representing portions having changed pixels between a current frame and new frame, common key frames and motion hints. In some embodiments, when rendering a new user interface frame, UI render engine 113 may move graphical objects within a current frame to render the new frame. As a result of moving the graphical objects, the UI render engine has knowledge of and may generate motion hints and determine dirty rectangles.

UI Encoder 114 includes new frame 115, current frame 116, common key frames 122, motion encoder 118 and delta encoder 119. As illustrated, several common key frames 1-N may be included in common key frames 122. Delta encoder 119 determines and encodes differences or "deltas" between a new frame and current frame which may or may not be modified. The current frame may be modified by applying motion commands to the current frame. Delta encoder may encode RGB data, alpha data (or some other type of data format used to present graphical information) to generate a payload which is transmitted from server 110 to the client 130.

Application 111 of server 110 generate frames for a user interface via UI framework 112 and UI render engine 113. The frames, including dirty rectangles and motion hints, are sent to the UI encoder 114 as a series of new frame 115, processed by the cache logic within UI Encoder 114 and motion encoder 118, and then delta encoded against current frame 116 before being sent to the Client 130 as an encoded payload. Motion hints can be specified by the UI Render Engine 113 and passed to the UI Encoder 114. The UI encoder will sort and verify these hints in the motion encoding logic 118 to properly handle overlaps and verify that frame data hints result in useful motion commands. Operation of application 111, UI encoder 114 and other server functionality is discussed in more detail below with respect to FIGS. 2B-10.

In some embodiments, the present technology may be used to update only a portion of an entire user interface frame or separately and simultaneously update multiple portions of an entire user interface frame. Each user interface frame portion may include a sub-window, frames that don't consist of the entire user interface, or other portions of the user interface frame. The user interface frame portions may be visible or non-visible, have different sizes, and/or provide caching differently. When addressing one or more portions of a user interface frame, multiple instances of UI encoder 114 and UI decoder 131 (as well as other modules, optionally) may be instantiated at a server and/or client. The multiple instantiations may each maintain payload streams between the server and the client. Though, the following discussion will address a single instantiation address an entire user interface frame, it is intended that the present technology can be applied to less than an entire user interface frame as well as simultaneously updating multiple portions of an user interface frame.

Network 120 may be implemented as the Internet or other WAN, a LAN, intranet, extranet, private network or other network or networks.

Client 130 may be a thin client used to remotely access and render interface graphics provided by server 110 over network 120. Client 130 includes UI decoder 131 and display device 135. UI decoder 131 includes payload decode 132, current frame 133 and cached common key frames 134. Payload decoder 132 is a module or set of code and/or hardware that decodes a payload and applies commands, deltas and other payload data against current frame 133 or one of cached frames 134. Operation of payload decoder 132 and other elements of client 135 are discussed in more detail below with respect to FIGS. 2A and 14-19. The cached common key frames 134 are the same common key frames 122 stored at UI encoder 114.

FIGS. 1B-1E illustrate a progression of frame processing implemented by the current technology. FIG. 1B is an example of a current frame rendered in a user interface at client 130. The current frame in FIG. 1B includes three rectangles of pixel data which are associated with, from left to right, a skier icon, a rock climber icon and a face icon. FIG. 1C is an example of a new frame to be rendered in the user interface as a result of a user interface update rendered at UI Encoder 114 new frame 115. The new frame of FIG. 1C can be rendered in response to user input and will replace the current frame of FIG. 1B. The new frame differs from the current frame in that the rock climber rectangle and face rectangle are in a different position, the skier rectangle is not present in the new frame, and a new horse rider rectangle is included.

FIG. 1D illustrates how motion commands are applied to the rectangles in the current frame and the new frame. Motion commands may consist of a motion vector, shape information for the shape to more (such as a rectangle length and width), and an origin for the shape. A first motion vector indicates that the rock climber rectangle has moved from the center of the screen to the left side of the screen in a horizontal direction. A second motion vector indicates that the face rectangle has moved from the right side of the screen to the center and to a vertical position located below its previous position in the current frame. The system may also detect that the new position of the face rectangle overlaps with the original position of the rock climber rectangle. Thus, there is motion collision between the new pixels of the face rectangle and the old pixels of the rock climber rectangle. The motion collision process determines that the motion command for the rock climber rectangle must be applied before the motion command for the face rectangle so the original pixels comprising the rock climber rectangle are not overwritten by the movement of the face icon rectangle. Once motion commands are sorted and otherwise processed (discussed in more detail below), the motion commands are applied to the copy of the current frame stored at the server.

After the motion commands have been applied to the current frame at the server, the difference in pixel values is determined between the modified current frame and the new frame. FIG. 1E illustrates the difference between the modified current frame of FIG. 1D (after the motion commands have been applied) and the new frame of FIG. 1C. The only difference is the horse riding rectangle on the right side of the frame in FIG. 1E. Since the positions of the rock climbing rectangle and the face rectangle should match or be within a threshold, there is no recognizable difference between these pixels as illustrated in the difference frame of FIG. 1E. As a result, a payload for updating the current frame of FIG. 1B to the new frame of FIG. 1C would consist of encoded motion commands for the moving face rectangle and rock climbing rectangle and encoded pixel data for the difference comprising the horse riding rectangle.

FIG. 1F shows an example of 3 current frames which a UI render engine could pass to the UI Encoder 114. FIG. 1G shows 3 examples of the next frame showing changes in the user interface to be encoded and remoted to the client 130.

FIG. 1H shows a graphical representation of the payload which would be generated from current frames in FIG. 1F and new frames in FIG. 1G using tradition dirty rectangle remoting techniques where all bitmap data within the dirty rectangles are remoted to the client 130. FIG. 1I shows a graphical representation of the payload which would be generated from current frames in FIG. 1F and new frames in FIG. 1G using a delta encoder, which shows only the pixels which were not similar being encoded and remoted to client 130.

Generation of Payload by Motion, Cache and Delta Encoding

Figure 2:
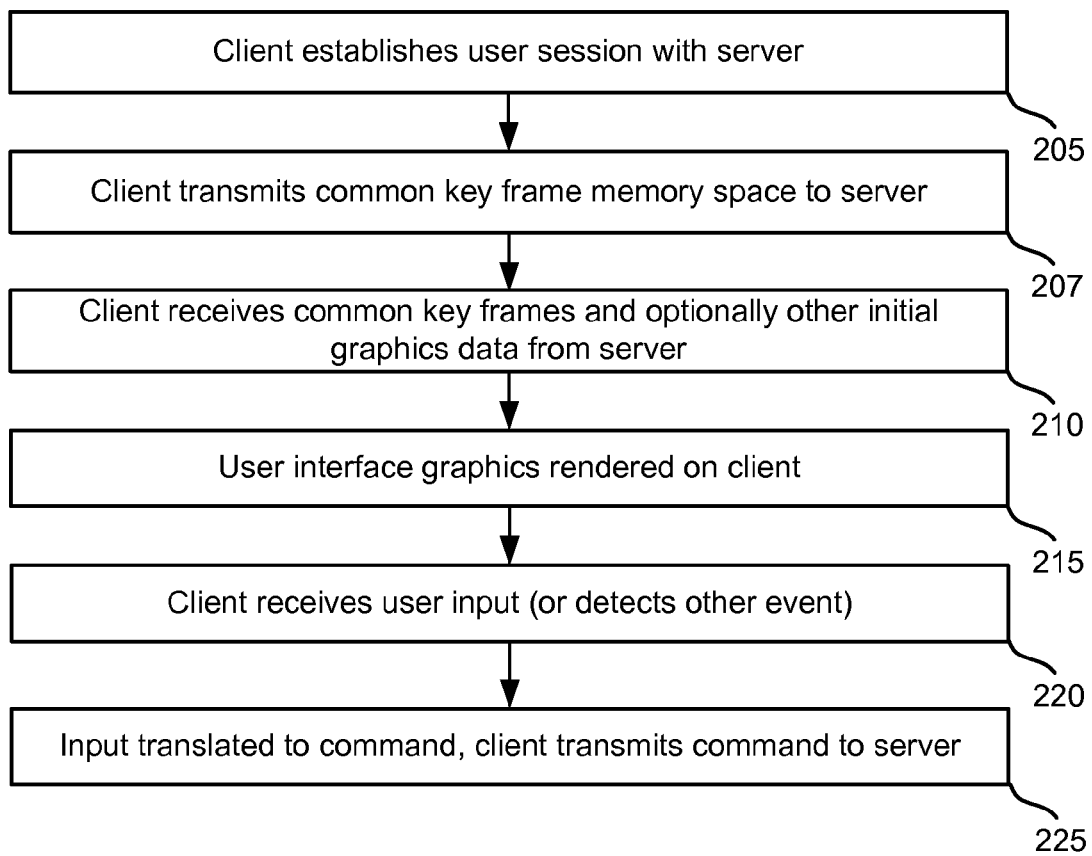
FIG. 2 is a flowchart of an embodiment of a method for establishing a remote session.

Server application III and UI encoder 114 may generate and transmit a payload to client 130 over network 120. In some embodiments, the payload may be generated and transmitted during a remote session between server 110 and client 130 and in response to input data received from client 130 by server 110. FIG. 2 is a flowchart of an embodiment of a method for establishing a remote session. The method of FIG. 2 provides details for establishing a remote session from a client point of view. Details regarding rendering, encoding and transmitting user interface graphics to the client in a payload after the remote session has been established is discussed in more detail below in FIG. 3. Details regarding receiving and decoding user interface graphics by client 110 are discussed in more detail below in FIG. 12.

First, client 130 establishes a remote session with server 110 over network 120 at step 205. The user session is a remote session allowing client 130 to remotely render user interface graphics associated with an interface provided by server 110. Next, client 130 sends an indication of the memory space allocated for common key frames to server 110 at step 207. The memory space indication is sent to the server to allow the server to determine how many common key frames may be cached at the client. The server receives the memory space allocation indication and determines the number of common key frames that can be cached at the client.

The client 130 receives common key frames and optionally other initial user interface graphics data are received from server 110 at step 210. Receiving the common key frames may include receiving bit data comprising one or more backgrounds to be cached at the client. The common key frame data may be in RGB data, alpha data, or graphical information in some other type of data format. In some embodiments, the first common key frame to render at the client is also identified in the initial graphics data received by the client from the server. The user interface graphics are rendered at client 130 at step 215 and client 110 receives user input through the initial user interface (or detects some other event at the client) at step 220. In some embodiments, step 220 may include detecting the occurrence of another event for which data is transmitted to server 110, such as the expiration of a timer. The discussion below will proceed with respect to receiving user input, but could be based on non-user initiated event as well. The received user input is translated to a command and transmitted to server 110 by client 130 at step 225. Server 110 may receive the user command from client 130 and process the command. Processing a command from a client to encode and transmit a payload is discussed in more detail below with respect to FIG. 3.

Figure 3:
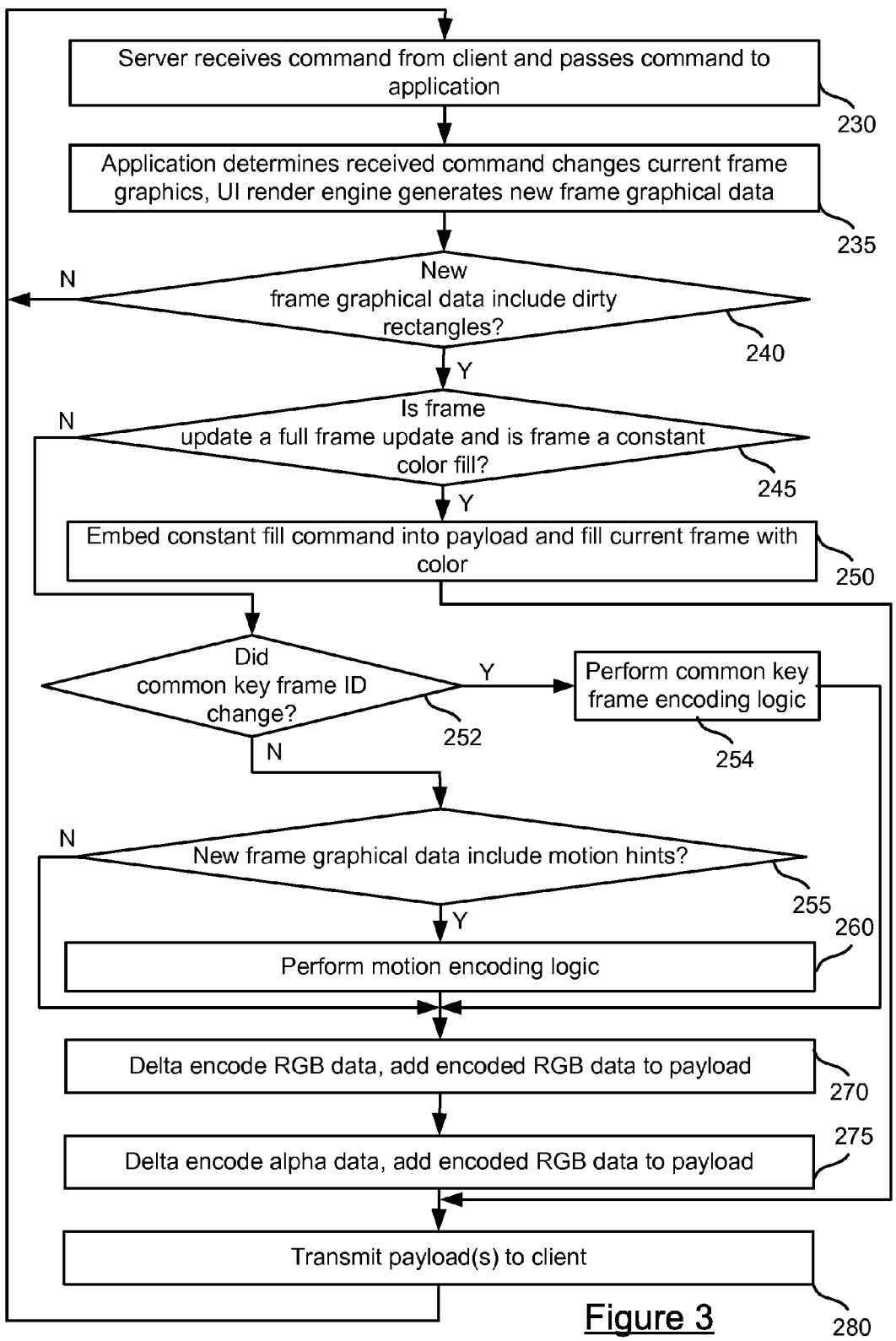
FIG. 3 is a flowchart of an embodiment of a method for encoding and transmitting a payload by a server.

FIG. 3 is a flowchart of an embodiment of a method for encoding and transmitting a payload by a server. The method of FIG. 3 may be performed in response to receiving a command, user input, or other data from client 110. First, server 110 receives a command from client 130 and passes the command to application 111 at step 230. Next, application 111 determines that the received command changes the current frame graphics and UI render engine 113 generates new frame graphical data at step 235. In some embodiments, new frame graphical data may include any of a new frame, motion hints, and dirty rectangles representing changes between a current frame and the new frame. As discussed above with respect to FIG. 1A, when UI render engine renders a new frame, it may move objects within a current frame to create the new frame. By moving one or more objects, the UI render engine has knowledge of graphical content that moves between a current frame and the new frame to replace the current frame. The UI render engine may then generate motion hints based on objects that it moves to create the new frame and dirty rectangles which comprise one or more bounding rectangles that enclose the source and destination of the objects that have moved. In some embodiments, different shapes may be used to indicate a "dirty" or changed portion of a frame, such as a circle, square, triangle, polygon, or any other shape. Generally speaking, rectangles will be referred to throughout this discussion for purposes of example only, and are not intended to limit the scope of the present technology. Generating new frame graphical data is discussed in more detail below with respect to FIG. 4.

A determination is then made as to whether the graphical data includes dirty rectangles at step 240. If the graphical data generated at step 235 includes one or more dirty rectangles, the method continues to step 245. If the graphical data does not include one or more dirty rectangles, then no graphics in the current frame have been changed in the new frame, no payload needs to be sent to client 130 and the method returns to step 230.

A determination is made as to whether the update is a full frame update and whether the new frame is a constant color fill at step 245. The determination may involve whether the sum of the dirty rectangles is equal to the size of the current frame. In some embodiments, the determination may involve whether the sum of the dirty rectangles meets a percentage threshold of the current frame, such as eighty percent or ninety percent, or meets some other threshold indicating that a majority of the frame requires a graphical update. If the new frame is a full frame update and the frame is a constant color fill, a constant fill command is embedded into the payload and the current frame is filled with the color fill color at step 250 and the method continues to step 280. In some embodiments, the UI render engine may determine whether the new frame has a constant color fill and may provide this information to UI encoder 114. If the new frame is a constant color fill, then the cache command generated for a selected cache will include constant fill data.

If either the new frame is not a full frame update or the frame is not a constant color fill, a determination is made as to whether the common key frame ID changed at step 252. The common key frame ID may change if the UI framework generates a new frame that has includes a new background or other frame content that matches a common key frame sent to client 130 as part of step 210 of the method of FIG. 2. UI encoder may make the determination as to whether the common key frame ID has changed based on an indication of the common key frame ID received from UI framework 112.

If the common key frame ID has changed, common key frame encoding logic is performed at step 254. Common key frame encoding logic sets the current common key frame to the identified common key frame at the server and generates and encodes a common key frame command. Common key frame encoding logic is discussed in more detail below with respect to the method of FIG. 6. After performing common key frame encoding logic at step 254, the method continues to step 270.

In some embodiments, common key frame caching and motion encoding are not performed on the same user interface update. Common key frame caching involves identifying a key frame used to create the new frame and performing delta encoding between the selected common key frame and the new frame to encode the differences. Motion encoding involves determining one or more rectangles or other shapes of graphical data that have moved between a current frame and a new frame based on motion hints, reducing the motion hints and generating motion commands from the reduced set of motion hints, and applying the motion commands to the current frame. Applying the motion commands to the cached frame will not result in the same modified frame as applying the motion commands to the current frame (which is what the motion hints were generated from). Modifying the cached common key frame with motion commands generated for the current frame would likely require a large delta encoded payload to "fix" the modified cached common key frame into the new frame. In this embodiment, common key frame encoding logic in step 254 and motion encoding logic in 260 are mutually exclusive in that only one set of logic operations will be performed on any given frame. However, there other embodiments exist in which these operations are not mutually exclusive.

If it is determined that the a common key frame ID did not change at step 252 of the method of FIG. 3, a determination is made as to whether the new graphical data includes motion hints at step 255. The motion hints are required for motion encoding. If UI render engine 113 generated one or more motion hints at step 235, then motion encoding logic is performed at step 260. Motion encoding logic determines whether any motion commands should be generated from the motion hints and encodes any motion commands into the payload. In some embodiments, when considering whether to generate motion commands, the motion encoding logic may remove overlapping hints and clip, order and verify the motion hints. Generated motion commands may be output to a payload and/or applied to the current frame maintained at the server. Performing motion encoding logic is discussed in more detail with respect to FIG. 7A. After performing motion encoding logic, the method of FIG. 3 continues to step 270.

Delta encoder 119 performs delta encoding of red-green-blue (RGB) data and adds the encoded RGB data to a payload at step 270. Delta encoding of RGB data may include determining the difference or "delta" between the new frame rendered by UI render engine 113 and either a modified current frame in which motion commands have been applied or a selected common key frame selected by the common key frame encoding logic. The delta encoding process may encode pixel differences in segments within a raster. The segments may be lossless and represent the exact difference in color value or be lossy to some degree based on a specified tolerance. For lossy segments, fragmentation between the segments is minimized by allowing short runs of non-delta values (pixels with the same data value) to be included in the raster segment. By including a short run of non-delta values in a segment containing delta values, creating a new raster segment is avoided along with the storage overhead in the output stream required by a new segment. Delta encoding RGB data is discussed in more detail below with respect to FIG. 7.

In some embodiments, alpha data in a user interface frame may be encoded separately from RGB data. Because the encoded alpha data may not vary as much as the RGB data delta, separately encoding the alpha data from the RGB data can result in a smaller and more efficient payload. Alpha delta encoding and adding the encoded alpha data to the encoded payload is performed at step 275. Delta encoding the alpha data includes determining the difference between the alpha data in the new frame rendered by UI render engine 113 and the alpha data in either a modified current frame in which motion commands have been applied or a selected common key frame selected by the common key frame encoding logic. The delta encoding process may encode pixel differences in segments within a raster in similar manner to encoding of RGB data. The alpha encoded segments may be lossless and represent the exact difference in alpha value or be lossy to some degree based on a specified tolerance. Fragmentation between segments is minimized by allowing short runs of non-delta alpha values to be included in the raster segment to avoid creating a new raster segment which would require more storage overhead in the output stream than to simply include the short run of non-delta alpha values. In some embodiments, the alpha data may be run length encoded if the length of constant alpha values was long enough to store it more efficiently than as one or more segments. Run length encoding (RLE) of alpha values can be advantageous because alpha values are often constant over entire longer pixel runs, entire rasters, or even entire frames.

Figure 11:
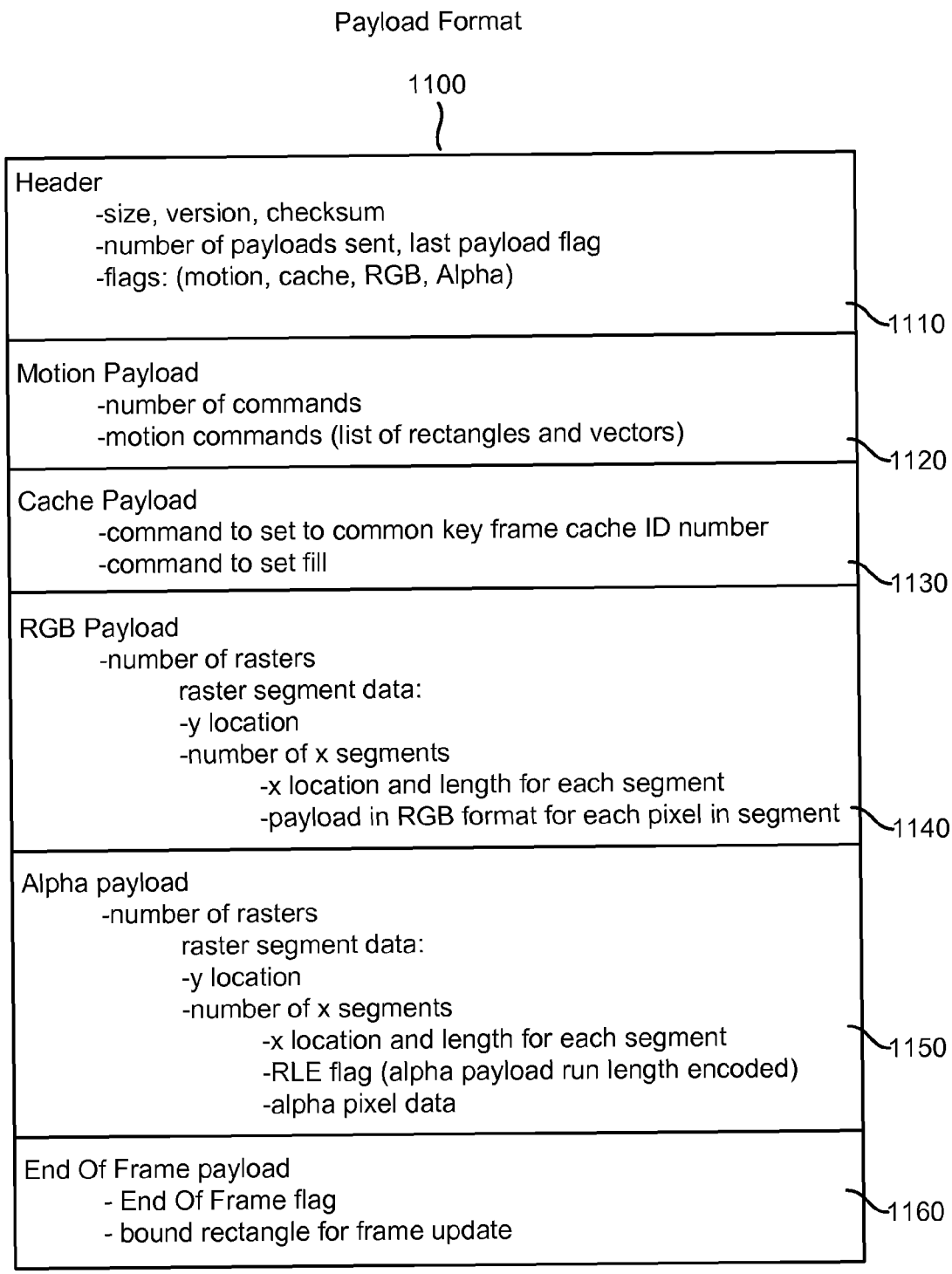
FIG. 11 is an example of a payload format.

After delta encoding is complete, the generated payload is transmitted to client 130 at step 280. One example format of a payload is illustrated in FIG. 11 and discussed in more detail below. In some embodiments, a single user interface graphical update may require several payloads, depending on the client cache and other factors. When sending multiple payloads, the last payload may be signified by a flag in the corresponding last payload. In some embodiments the last payload for a frame may also include a bounding shape to inform the UI Decoder 131 what areas of the current frame needs to be updated on the display device 135 to minimize the operations needed to display the frame. Client logic for receiving and decoding a payload is discussed in more detail below with respect to the method of FIG. 14.

Figure 4:
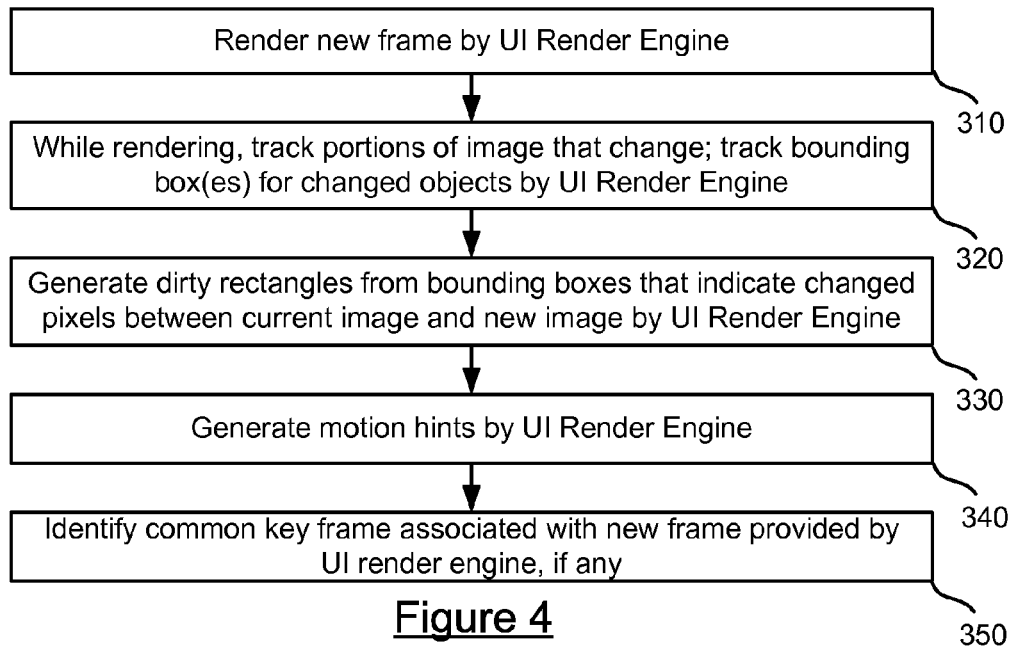
FIG. 4 is a flowchart of an embodiment of a method for generating new frame graphical data.

FIG. 4 is a flowchart of an embodiment of a method for generating new frame graphical data. In some embodiments, the method of FIG. 4 provides more detail for step 235 of the method of FIG. 3. First, a new frame 115 is rendered by UI render engine 113. The new frame may be rendered by UI engine 113 in response to user input, an event, a command or some other data received from client 130. While rendering the new frame, UI render engine 113 tracks portions of the new frame that change (step 320). In some embodiments, bounding rectangle boxes (or other shapes) that contain changed objects are tracked Next, dirty rectangles are generated from the bounding boxes at step 330. The dirty rectangles contain one or more pixels that change between the current frame and the new frame. Motion hints are generated at step 340. A motion hint indicates detection of "motion" based on the position of an object in a current frame and a different position of the object in the new frame. A motion hint comprises a vector, an origin and data for the shape that moves, for example a length and width for a rectangle motion hint. Not all motion hints for objects detected to move during new frame rendering are translated into motion commands. For example, some motion hints collide with other motion hints and cannot be viewed in the current frame or new frame, additionally objects that rotate, scale or are transparent may not generate motion hints. Generating motion hints is discussed in more detail below with respect to FIG. 5.

At step 350, a common key frame associated with a new frame is identified by the UI render engine. The common key frame may be used by UI Framework 112 to generate the new frame, and identification of the common key frame may be provided by UI framework 112 to UI render engine 113. The common key frame identified may be one of several common frames 121 that maintained at server 110 as a copy of the common key frames 134 that are maintained at client 130.

Figure 5:
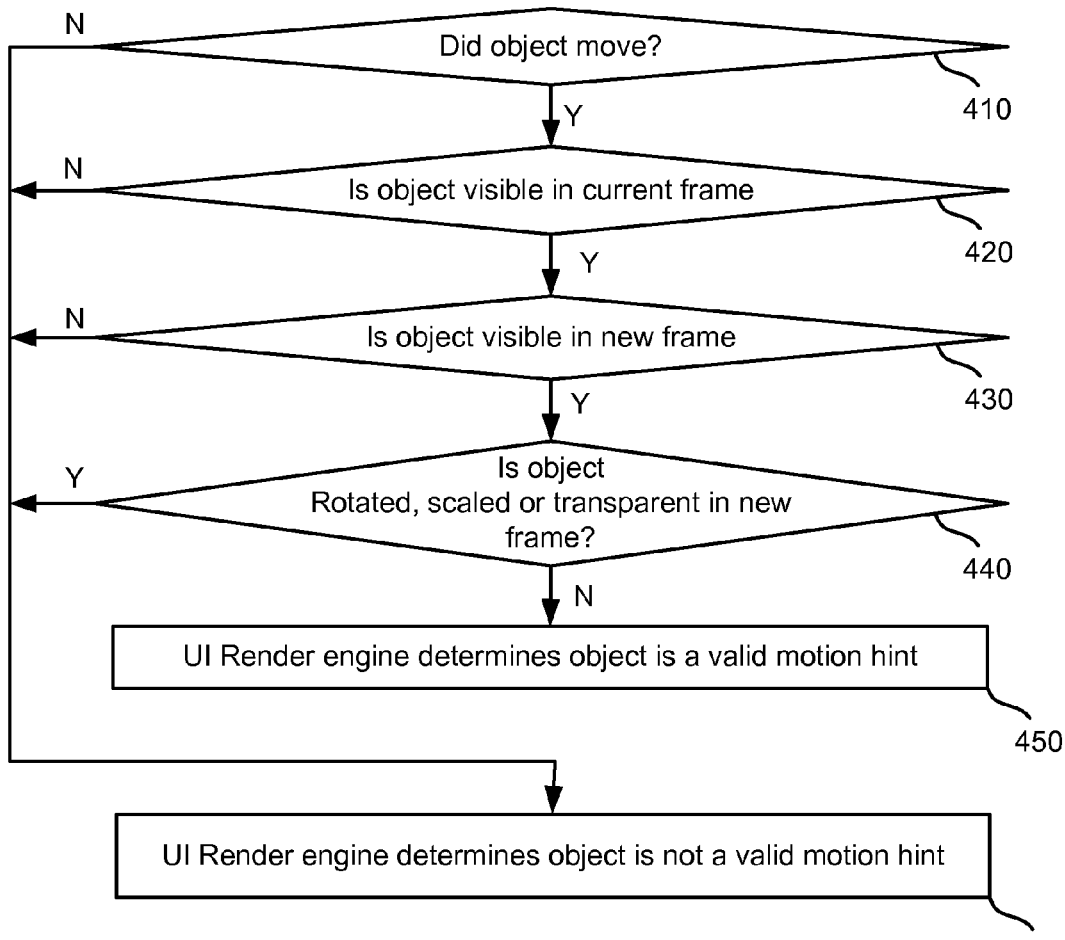
FIG. 5 is a flowchart of an embodiment of a method for generating motion hints by a render engine.

FIG. 5 is a flowchart of an embodiment of a method for generating motion hints. In some embodiments, the method of FIG. 5 provides more detail for step 310 of the method of FIG. 4 and is performed by UI render engine 113. First, render engine 113 makes a determination as to whether a particular object was detected to move during new frame rendering at step 410. An object has moved if the object was in a first position in a current frame and in a different location in the new frame. If a particular object did not move, then UI render engine 113 determines the object is not a valid motion hint at step 460.

If an object has been detected to move, a determination is made as to whether the object is visible in the current frame at step 420. For example, an object may be visible in a current frame (or not visible) as a result of layering features implemented in the current frame. If an object is not visible in a current frame, the object is not a valid motion hint (step 460). If the object is visible in the current frame, a determination is made as to whether the object is visible in the new frame at step 430. For example, an object may not be visible in a new frame if the object has been moved to a position outside the current frame or is behind an obstructing object or layer. If an object is not visible in the new frame, then the object is not a valid motion hint as indicated at step 460. If the object is visible in the new frame, a determination is made as to whether the object has been rotated or is transparent in the new frame at step 440. Objects that have been rotated or transparent are not processed as a motion hint. If the object has not been rotated or scaled, or is not transparent in the new frame, then the object is considered a valid motion hint at step 450.

Figure 6:
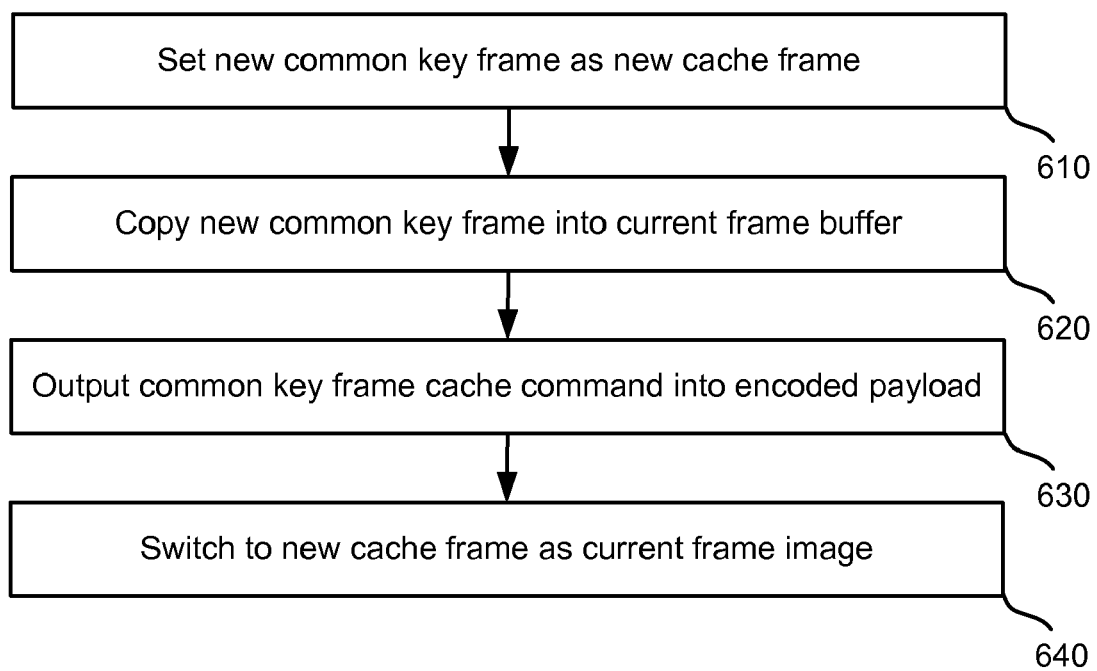
FIG. 6 is a flowchart of an embodiment of a method for performing common key frame cache logic.

FIG. 6 is a flowchart of an embodiment of a method for performing common key frame encoding logic. In some embodiments, the flowchart of FIG. 6 provides more detail for step 254 of the method of FIG. 3. First, the new common key frame identified by UI encoder 113 is set as the new cache frame at step 610. Next, the new common key frame is copied into the current frame buffer at the server at step 620. The new common key frame is copied into the current frame buffer to allow the UI encoder to process the new common key frame to achieve the new frame. After copying the new common key frame, a common key frame cache command is output into the encoded payload at step 630. When written by the UI decoder at client 130, the common key frame cache command results in selection of a common key frame as the current common key frame. After the new common key frame is selected, encoded delta commands and optionally other commands may be applied against the selected common key frame at the client. The new common key frame is selected from a cache at the client and set as the new current frame at the server at step 640. A copy of the cached common key frames is maintained at the server. When a new frame is generated from a common key frame, that cached common key frame at the server is made the new frame and delta encoding is applied against it to complete the new frame.

Figure 7A:
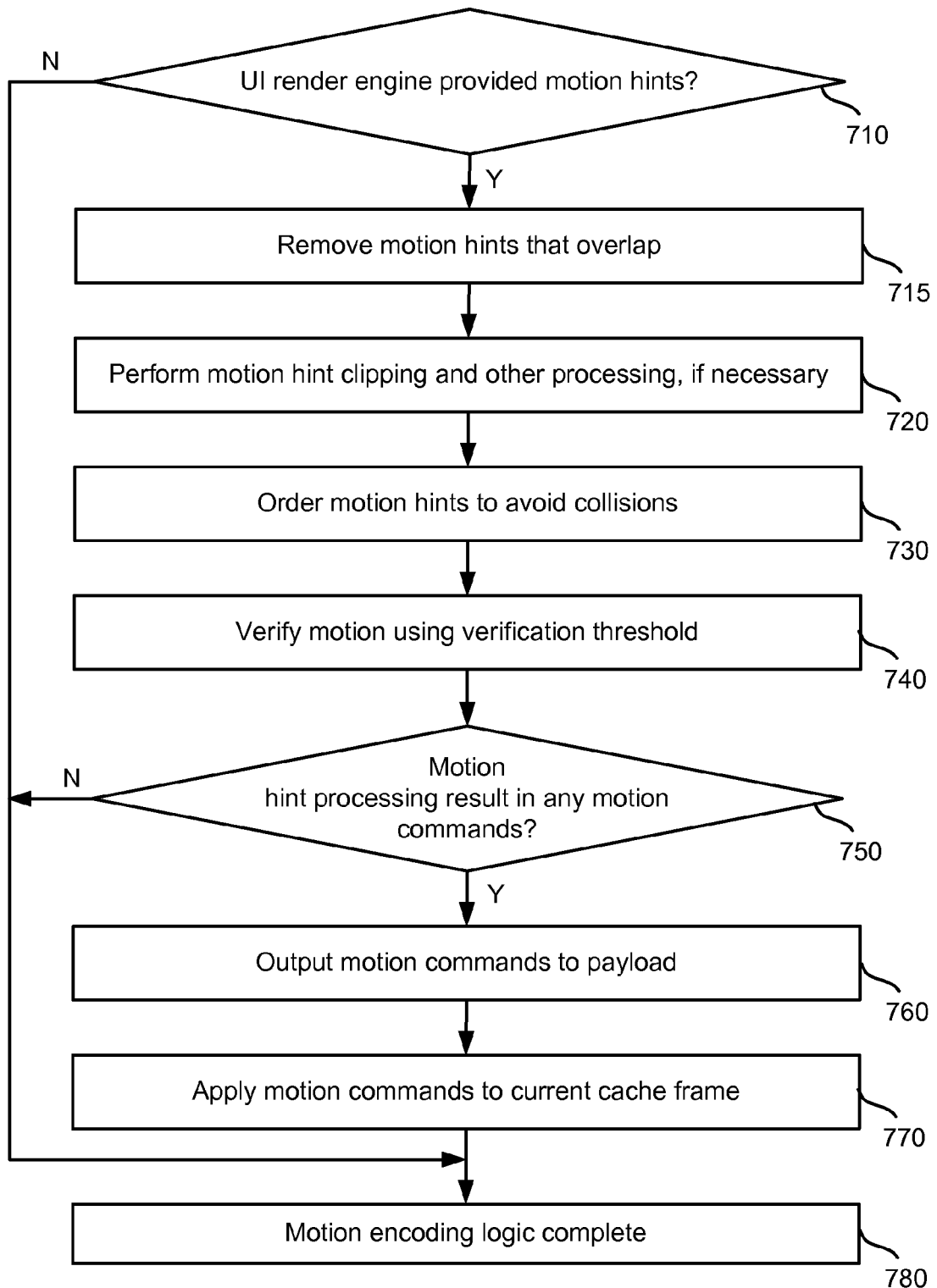
FIG. 7A is a flowchart of an embodiment of a method for performing motion encoding logic.

If common key frame encoding logic is not performed in the method of FIG. 3, motion encoding logic is performed. FIG. 7A is a flowchart of an embodiment of a method for performing motion encoding logic. In some embodiments, the method of FIG. 7A provides more detail for step 260 of the method of FIG. 3.

First, a determination is made as to whether the UI render engine 113 provided motion hints at step 710. Providing motion hints by UI render engine 113 was discussed above with respect to step 340 of the method of FIG. 4. If the UI render engine did not provide motion hints, motion encoding logic is complete at step 780 and no motion commands are generated.

Figure 7B:
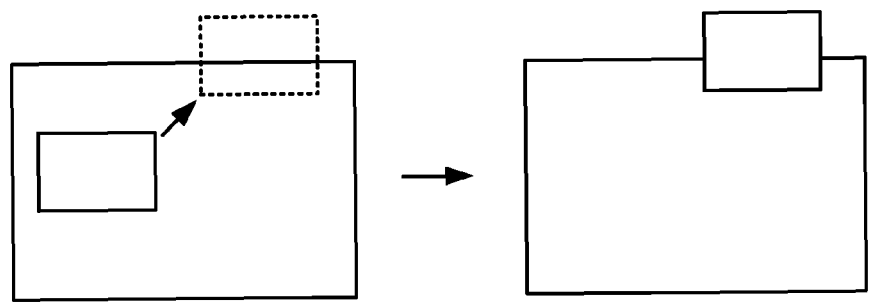
FIG. 7B is an example of rectangle movement between a current frame and a new frame.
Figure 7C:
FIG. 7C is an example of rectangle clipping.
Figure 7D:
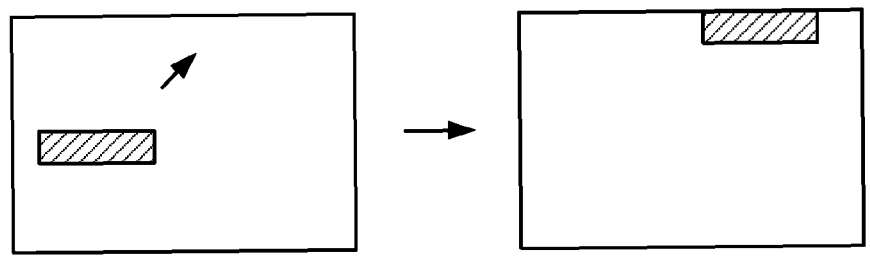
FIG. 7D is an example of a modified rectangle movement between a current frame and a new frame.

If UI render engine 113 provided one or more motion hints, then any of several steps can be performed to reduce the number of motion hints to make the motion encoding process more efficient. Motion hints that overlap are removed at step 715. In some embodiments, the overlapping motion hint having the smaller rectangle is removed from the motion hint list. Motion hint clipping is performed if needed at step 720. Motion hint clipping involves removing or "clipping" a portion of a rectangle associated with a motion hint because the portion is positioned off the frame in the destination. Conceptual steps of performing clipping of motion hints are illustrated in FIGS. 7B-7D. Motion hints in the list are ordered to avoid collisions at step 730. Additionally, in some embodiments, if more than one motion hint result in the same destination, all but one of those colliding motion hints are removed. In some embodiments, two or more motion hints having a destination rectangle that collides with a source rectangle of another motion hint are set to execute in an order that minimizes the overwriting of source rectangles before the motion command for source rectangle is applied.

Motion verification is then performed using a verification threshold at step 740. The motion verification verifies that the rectangle associated with the motion hint would be most efficiently rendered by a motion command combined with delta encoding as opposed to delta encoding alone. In some embodiments, motion verification compares each pixel between a source rectangle and a destination rectangle and increments a pass counter or fail counter based on whether the pixels match (in some embodiments, within a comparison threshold). The verification is based on which of the pass counter or fail counter satisfy a corresponding threshold first, and motion commands are generated for motion hints that pass the verification process. Motion verification is discussed in more detail below with respect to the method of FIG. 8A.

Motion commands are output to a payload at step 760. Motion commands are generated for those motion hints that survive the motion hint reduction steps and satisfy a verification process. In some embodiments, a motion command may consist of a vector and rectangle data, including an origin, length and width. An example of the format of motion commands in a payload is illustrated by motion payload 1120 of the payload of FIG. 11.

After outputting the motion commands to the payload, the motion commands are applied to the current cache frame maintained at server 110 at step 770. The motion commands are applied to the current frame at the server in order to enable the delta encoder to correctly determine what needs to be encoded in the modified current frame in order to render the new frame. If the motion commands were not applied to the current cache frame at server 110, delta encoding the unmodified current frame against the new frame would result in much more encoded delta data included in the payload (which would affect processing of the thin client) and an unnecessary increase in network load. After applying the motion commands to the current cache frame, the motion encoding logic is complete at step 780.

FIG. 7B is an example of object movement. FIG. 7B includes a current frame (on the left) and new frame (on the right). In the current frame, a source rectangle is shown in solid line and expected destination of the rectangle in a dotted line. In the new frame, the rectangle destination is shown after the current frame has been modified with a motion command. As illustrated, the rectangle moves to a position in the new frame such that a portion of the rectangle is no longer contained within the frame. The rectangle as a whole is not a good candidate for a motion vector as is because a portion of the rectangle is moved to a position outside of the frame.

FIG. 7C illustrates a clipping process that can be performed on the rectangle. FIG. 7C illustrates an original rectangle on the left, the portion of the rectangle to be clipped in the middle, and resulting clipped rectangle on the right. In the middle of FIG. 7C, the portion of the rectangle to remain in the motion hint after the rectangle is clipped is shaded. The shaded rectangle on the right in FIG. 7C represents the result of the clipping of the original rectangle.

FIG. 7D illustrates the applying a motion command to the frame having the clipped rectangle. Previously, a portion of the moving rectangle was positioned outside the frame boundary in the new frame. In FIG. 7D, the moving rectangle has been modified such that only the portion which is contained within the new frame is processed with a motion hint. Thus, the portion of the object which was previously located outside the new frame has been clipped from the motion hint.

Figure 7E:
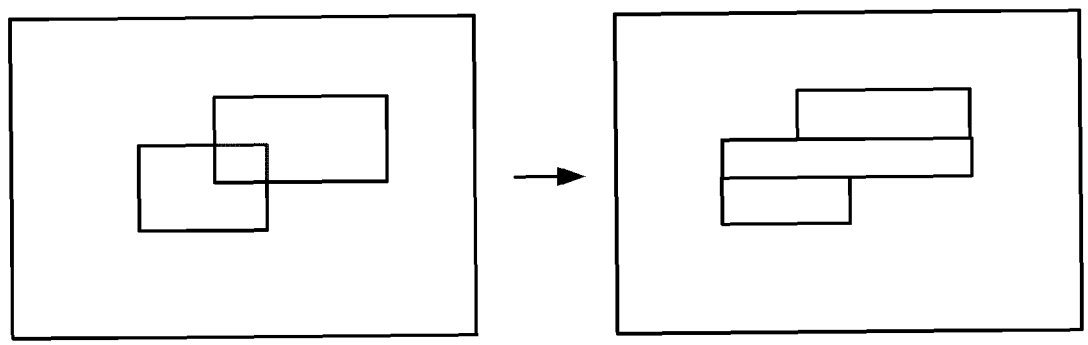
FIG. 7E is an example of reconfiguring overlapping dirty rectangles within a user interface.

FIG. 7E is an example of modified dirty rectangles. FIG. 7E includes a frame containing two overlapping dirty rectangles on the left and a frame of three adjacent dirty rectangles on the right. The two overlapping rectangles in the frame to the left partially overlap. Rather than encoding the overlapping portion twice, the two rectangles are broken up into three adjacent rectangles which do not overlap as shown in the frame to the right. In some embodiments, when reconstructing overlapping rectangles, the rectangles created to represent the overlapping rectangles are constructed to maximize a raster length for payload efficiency (thus, rectangles are chosen to maximize length rather than height). When the three adjacent rectangles are encoded, there will be no overlapping encoding and each rectangle can be represented by wide lengths of pixel segments described by origin and length.

Figure 8A:
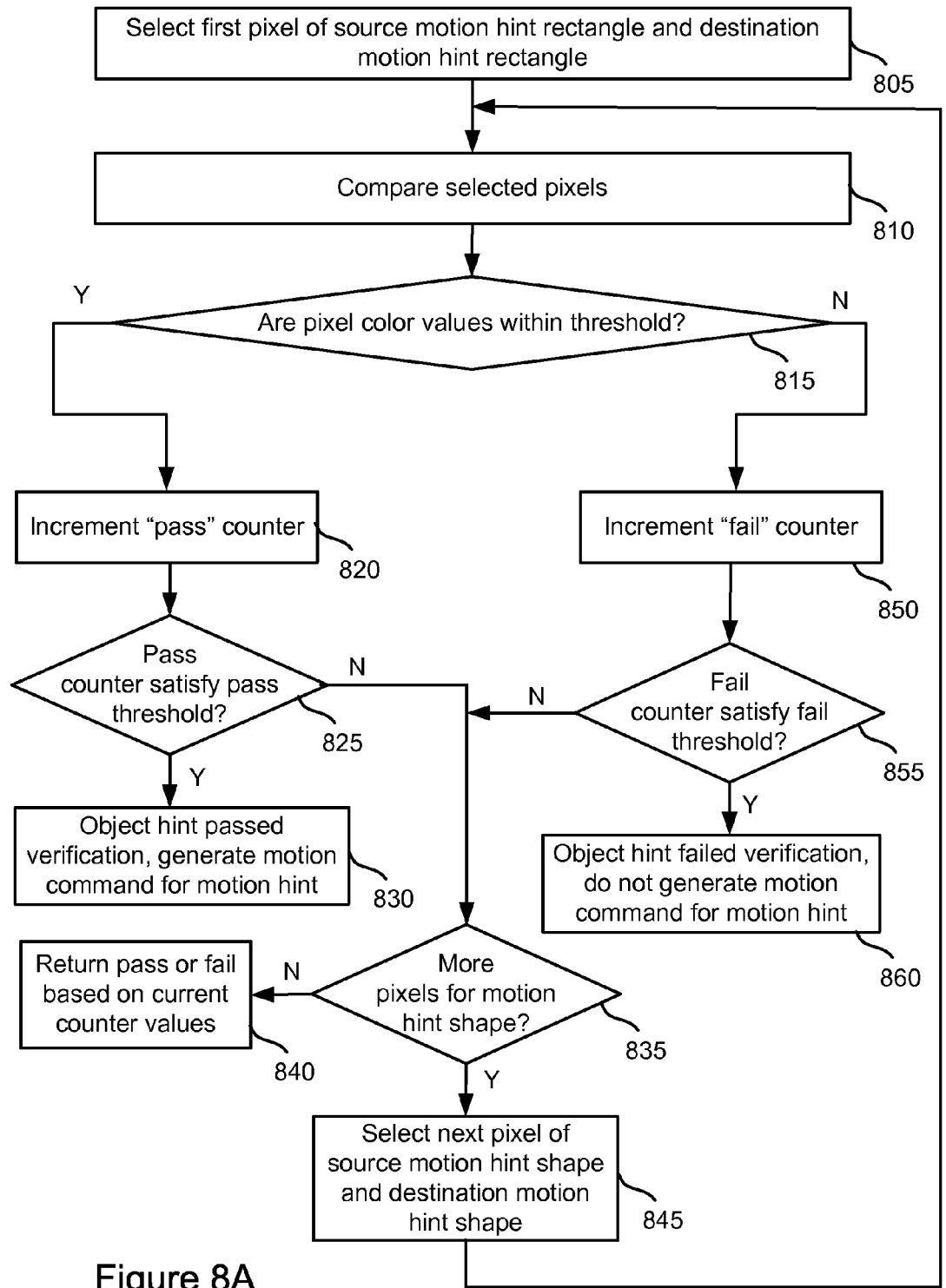
FIG. 8A is a flowchart of an embodiment of a method for verifying motion using a threshold.

As discussed with respect to the method of FIG. 7A, motion commands require that motion hints pass a verification process. FIG. 8A is a flowchart of an embodiment of a method for verifying motion using a threshold. In some embodiments, the method of FIG. 8A provides more detail for step 740 of the method of FIG. 7A. To verify motion associated with a motion hint, the method of FIG. 7B determines whether it would be more efficient to encode the differences of the moving rectangle or apply a motion command to the moving rectangle and then encode the resulting differences. First, a first pixel of the source motion hint rectangle and destination motion hint rectangle is selected at step 805. The selected pixels are then compared at step 810. A determination is then made as to whether pixel color values between the compared pixels are within a threshold at step 815. In some embodiments, the threshold may be zero difference for a lossless new frame. In some embodiments, the threshold may be seventy percent, eighty percent, ninety percent of color matching, or some other tolerance level of color similarity. If the pixel color values are not within the threshold, a fail counter is incremented at step 850 and a determination is made as to whether the fail counter current value satisfies a fail threshold at step 855. Selecting a fail threshold value is discussed below. If the fail counter satisfies the fail threshold, the object hint has failed the motion verification process and a motion command is not generated for the motion hint at step 850. If the fail counter does not satisfy the fail threshold, the method continues to step 835. In some embodiments, the determination of a valid move can be determined by calculating the total cost of the embedded delta payload without the motion applied and comparing to the total cost of the embedded payload with the motion applied, and deciding based on which results in a smaller payload.

If the pixel color values are within a threshold at step 815, a pass counter is incremented at step 820 and a determination is made as to whether the current value of the pass counter satisfies a pass threshold at step 825. If the pass counter value satisfies the pass threshold, the object hint has passed the verification process and a motion command is generated for the motion hint at step 830. If the pass counter does not satisfy the pass threshold, the method continues to step 835.

In some embodiments, the pass threshold and fail threshold may be related in that they add up to one hundred percent. Thus, a pass threshold may have a value of sixty percent of rectangle pixels and the fail counter may have a value of forty percent of the rectangle pixels. In some embodiments, both the pass threshold and fail threshold may be set to fifty percent of the pixels. In any case, the system determines whether each counter has reached a pixel count which satisfies the threshold percentage of total pixels in the rectangle. In some embodiments, the pass threshold and fail threshold may be selected based on factors of network resources, type of user interface graphics which are being encoded, motion encoding and delta encoding resources, and other data.

At step 835, a determination is made as to whether more pixels exist in the motion hint rectangle (or other shape). If more pixels exist, the next pixel in the source motion hint rectangle and destination motion hint rectangle are selected and the method of FIG. 8A continues to step 810. If no further pixels exist in the motion hint, a pass or fail value is returned based on current counter values.

Figure 8B:
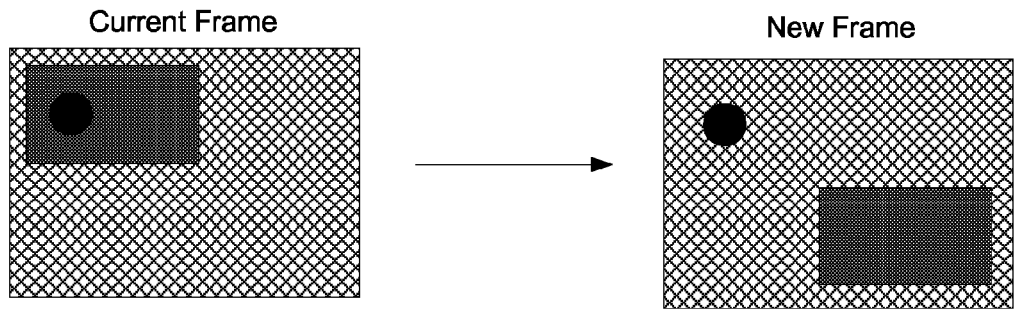
FIG. 8B is an example of a current frame and a new frame depicting a moving rectangle.
Figure 8C:
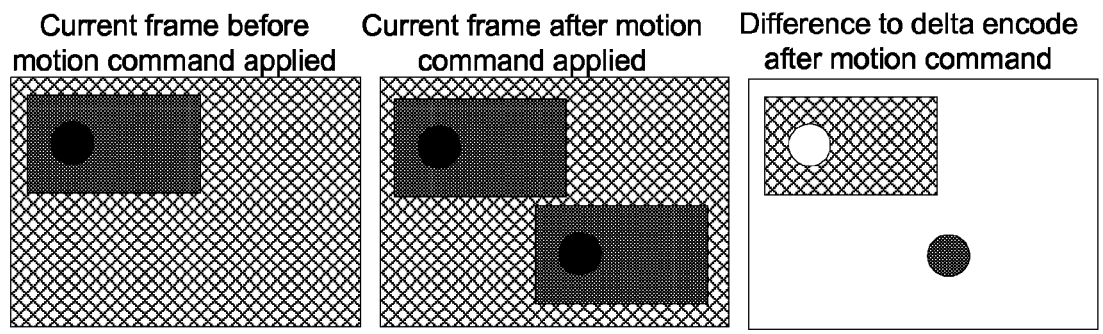
FIG. 8C is an example of a current frame wherein a motion command and delta encoding are applied.
Figure 8D:
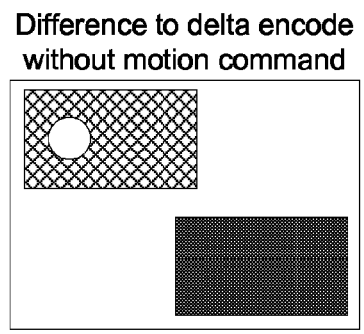
FIG. 8D is an example of a current frame wherein delta encoding is applied.

In some embodiments, the destructive motion compensation process of FIG. 8A determines whether it is more efficient to apply motion commands and delta commands to a current frame rather than just apply delta commands. FIGS. 8B-8D an example of the differences in between these two options with respect to an example frame. FIG. 8B is an example of a current frame and a new frame depicting a moving rectangle. The current frame on left in FIG. 8B includes a shaded background, a rectangle and a circle within the rectangle on the upper left portion of the frame. In new frame towards the right of FIG. 8B, the location of the circle has not changed but the rectangle has moved from the upper left to the lower right position of the frame.

FIG. 8C is an example of a progression of the current frame as motion command and delta encoding are applied. Of the three frames pictured in FIG. 8C, the left frame is the same as the current frame pictured in FIG. 8B. The center frame indicates the current frame after a motion command has been applied to the shape comprising the rectangle. Note that although only the rectangle moves to the new frame in FIG. 8B, the data comprising the rectangle in the current frame contains the circle as well, therefore creating an invalid state of the contents of the frame, which will be repaired by the delta encoder. Thus, the motion command moves a copy of the pixel data within the rectangle from the source position in the current frame to the destination position of the rectangle in the new frame. Next, the frame on the right indicates pixel data that the delta encoder determines needs to be encoded. The encoded data in the frame to the right is the encoding that the center frame in FIG. 8C requires to be changed into the new frame in the right side of FIG. 8B. In this example, delta encoder replaces the background where the object was moved, and repairs the invalid state created by the motion of frame data.

FIG. 8D is an example of a current frame wherein only delta encoding is applied to change the current frame of FIG. 8B into the new frame of FIG. 8B. As can be seen, the delta encoding requires that the destination location of the rectangle be encoded to match the background of the new frame (except for the location of the circle) and that the entire portion of the rectangle is encoded. The difference in encoding with and without encoding motion commands can be seen by comparing the encoded portions of the frame of FIG. 8D and the frame in the right of FIG. 8C. The frame in the right of FIG. 8C requires the encoding the source position of the rectangle (except for the position of the circle) as in FIG. 8D, but requires much less encoding to complete the pixels in the vicinity of the rectangle destination (encoding the small circle rather than the entire rectangle).

Some embodiments may verify motion by calculating the size of the payload produced both when a move is performed and when the move is not performed, and determines which option (delta encoding with or without the move operation) would produce the lowest delta encoded payload.

Figure 8E:
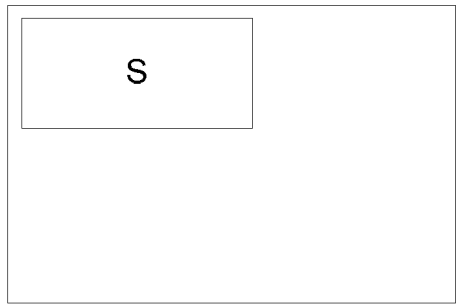
FIGS. 8E-8F are examples of data in a current frame and new frame used to verify whether to apply motion commands.
Figure 8E:
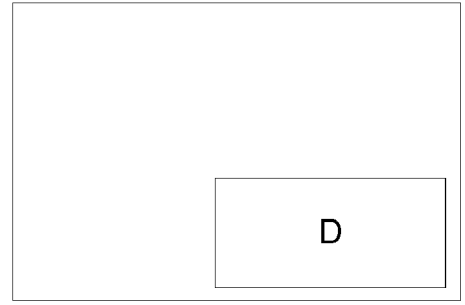

FIG. 8E shows a current frame and a new frame and contains source rectangle S and destination rectangle D. The two rectangles represent the areas specified by a motion hint and indicate a movement in a UI element between the current frame and the new frame. In this example, an object in the UI framework was rendered at source rectangle S in the current frame and was then rendered at destination location D in the new frame.

Figure 8F:
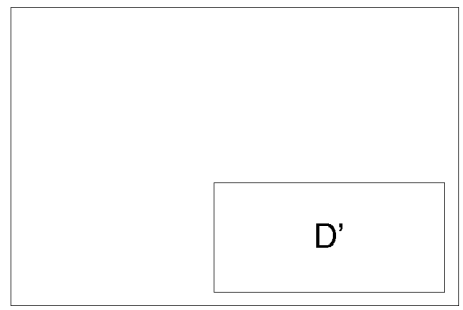
Figure 8F:
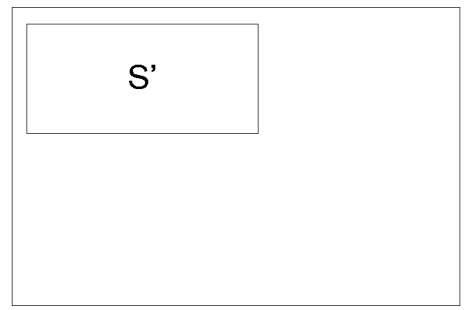

FIG. 8F shows the same current frame and the new frame depicted in FIG. 8E and contains destination rectangle D' and source rectangle S'. The rectangle D' presents the pixel data in the current frame which would be overwritten by the contents of rectangle S if a move is applied. The rectangle S' represents the new pixel data in the new frame which will be encoded into rectangle S when encoding is applied.

To calculate the cost of not performing the move operation for the motion hint and only using delta encoding, the following formula can be used: (S–S')+(D'–D), where subtraction indicates an operation where each pixel is compared at identical pixel locations in the two areas of the current frame and new frame. The result of the operation would be number of pixels deemed non-similar. To compute the cost of performing the move prior to delta encoding, this formula can be used: (S–S')–(S–D), which reflects applying the motion command by replacing D' with S. To decide whether or not the move will result in the smallest possible payload, the following logic applies: Move=(((S–S')+(D'–D))>((S–S')+(S–D))). This reduces to: Move=((D'–D)>(S–D)).

Figure 9:
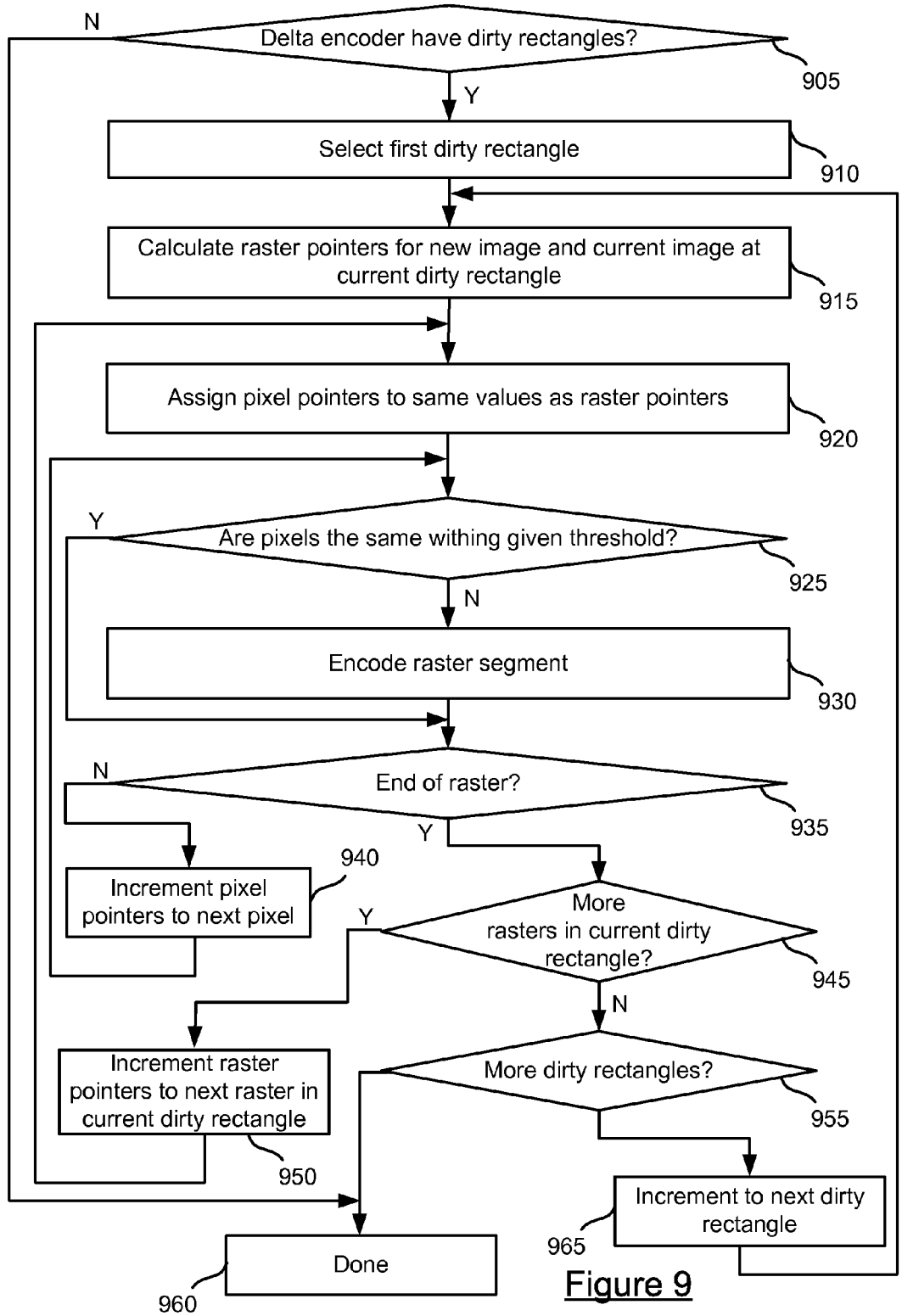
FIG. 9 is a flowchart of an embodiment of a method for performing delta encoding.

After performing motion encoding, data is delta encoded into the payload. The data to be delta encoded may include one or more of RGB data, alpha data, another format of graphical data, or some other data. FIG. 9 is a flow chart of an embodiment of a method for performing delta encoding for RGB data. In one embodiment, the method of FIG. 9 provides more detail for step 270 of the method of FIG. 2. First, a determination is made as to whether delta encoder 119 has access to dirty rectangles at step 905. The dirty rectangles may be generated by UI render engine 113. If the delta encoder does not have access to any dirty rectangles, the method of FIG. 9 is complete at step 960 because there is no data indicating any change between a current frame and a new frame.

If the delta encoder does have access to dirty rectangles, the first dirty rectangle is selected at step 910 and raster points are calculated at the selected dirty rectangle for the new frame and current frame at step 915. Raster pointers are calculated to point to the first pixel of the first raster in dirty rectangle position in both the new frame and the current frame. Pixel pointers are then assigned to the same values as the raster pointers at step 920.

A determination is made as to whether the pixels indicated by the pixel pointers are the same at step 925. The pixels are the same if they have the same RGB data values. In some embodiments, the determination may involve determining if the RGB values are within a certain threshold rather than whether the color values match exactly. If the pixels match (optionally, within a threshold) at step 925, the method continues to step 935. If the pixels do not match, a difference has been detected and a raster segment is encoded at step 930. Encoding a raster segment may include determining the length of pixel pairs along which the pixel values differ from the current raster in the selected dirty rectangle. In some embodiments, a raster segment may include a string of pixels pairs that do not differ (or not meeting the difference threshold) to avoid fragmenting the delta encoded raster segments. Once the end of a raster segment is determined, the RGB data for the raster segment is copied into the payload and applied to the current frame maintained at the server. Encoding a raster segment is discussed in more detail below with respect to the method of FIG. 10A with respect to RGB data and the method of FIG. 10B with respect to alpha data.

A determination is made at step 935 as to whether the end of the raster is detected at step 935. If the end of a raster is not detected, the pixel pointers are incremented to the next pixel in the raster at step 840 and the method continues to step 925.

If the end of the raster is detected, a determination is made as to whether more rasters exist in the current dirty rectangle at step 945. If more rasters exist in the current dirty rectangle, the raster pointers are incremented to the next raster at step 950 and the method continues to step 920. Incrementing raster pointers will move the pointer to the next raster in the dirty rectangle. If there are no more rasters at step 945, a determination is made as to whether more dirty rectangles exist at step 955. If delta encoder 119 has access to more dirty rectangles to analyze, encoder 119 increments to the next dirty rectangle at step 965 and the method returns to step 915. If there are no further dirty rectangles to process, then RGB delta encoding is complete at step 960.

Figure 10A:
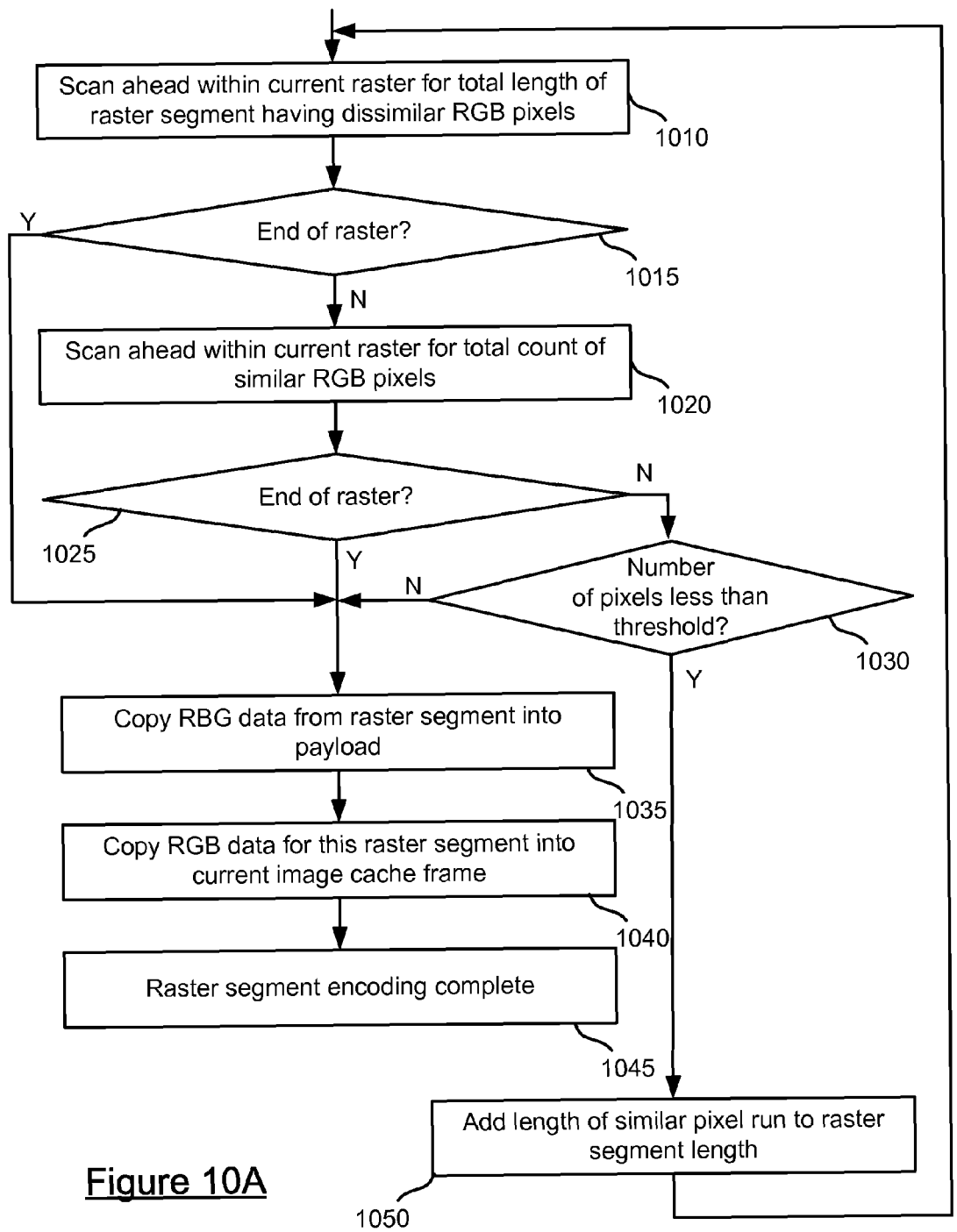
FIG. 10A is a flowchart of an embodiment of a method for encoding raster segments for RGB color data

Encoding a raster segment at step at step 930 in the method of FIG. 9 may include detecting a segment of pixels along a raster and encoding the set of pixels in the payload. The pixels may include pixels that are different between a current frame and new frame and, in some embodiments, pixels that are the same. FIG. 10A illustrates a flowchart of an embodiment of a method for encoding raster segments for RGB data as in step 930 of FIG. 9.

Upon detecting a pair of pixels that differ at step 925 of FIG. 9, delta encoder scans forward along the current raster to determine the total length of the raster segment having dissimilar pixels at step 1010. The scan mere detects the difference between pixels in the raster and does not record the pixel values at this time. When the scan has completed, delta encoder 119 determines whether the end of the length of the segment is the end of the current raster at step 1015. If the end of the segment corresponds to the end of the segment, the method continues to step 1035 where the RGB raster segment is copied to a payload (discussed below). If the end of the segment is not the end of the raster, then a similar pixel has been detected. At this point, delta encoder 119 scans ahead in the raster to determine the total count of pixels that are the same at step 1020. Once the end of the run of similar pixels is detected, a determination is made as to whether the end of the similar pixels corresponds to the end of the current raster at step 1025. If the end of the raster has been detected, the method continues to step 1035.

If the end of the raster has not been detected, then the run of similar pixels has ended with the detection of a pair of different pixels in the raster. At this point, a determination is made as to whether the number of pixels comprising the run of similar pixels is less than a threshold at step 1030. This determination decides whether the run of similar pixels is small enough such that the similar pixels may be included in the current raster segment. In some embodiments, the similar pixel length threshold may be selected based on factors of frame resolution, networking bandwidth, client memory size, and other factors. For example, the similar pixel length threshold in step 1030 may be two pixels, three pixels, or some other number of pixels. If the number of similar pixels is less than the threshold, the length of the similar pixel run is added to the raster segment length at step 1050 and the process return to step 1010. If the number of similar pixels is less than the threshold, the method continues to step 1035. In inclusion of small runs of similar pixels in the raster segment avoids unnecessary fragmentation of the raster segment, which allows for more efficient storage of the delta data in the payload.

The RGB data from the current raster segment is copied into the payload by delta encoder 119 at step 1035. The RGB data may include the raster, starting X position, the length of the raster segment, and data values for each pixel in the segment. An example of RGB payload data 1140 within a payload 1100 is illustrated in FIG. 11 and discussed in more detail below. After copying the RGB raster segment data to the payload, the RGB raster segment is applied to current frame 116 maintained at server 110. By applying each raster segment to the copy of the current frame, the UI encoder may update the current frame to reflect the current frame one raster segment at a time. By the time UI encoder has processed every dirty rectangle, the current frame RGB data should be modified into the new frame. After updating the current frame with the raster segment data, the raster segment encoding is complete at step 1045 and the RGB delta encoding process returns to step 935 of the method of FIG. 9.

Figure 10B:
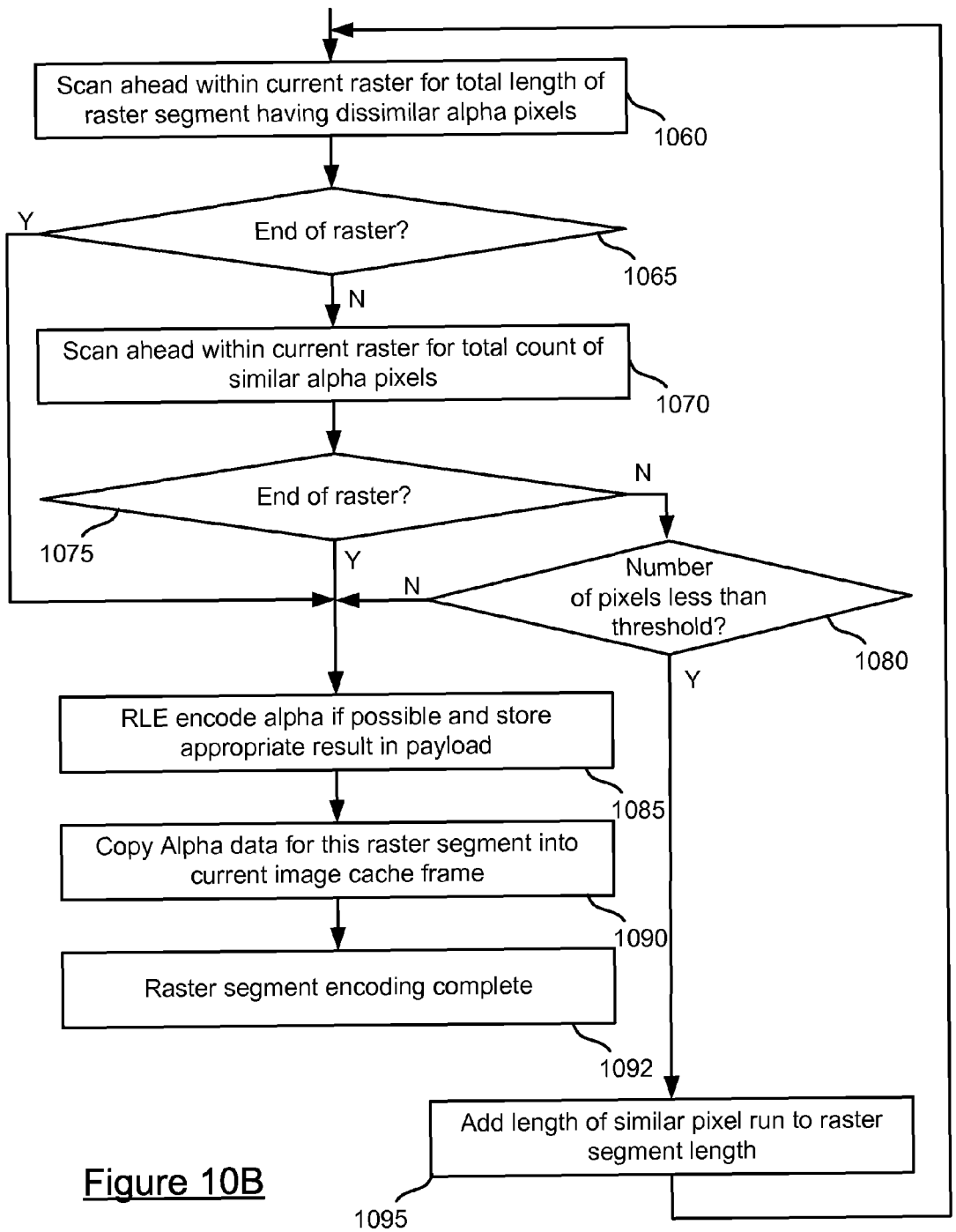
FIG. 10B is a flowchart of an embodiment of a method for encoding raster segments for alpha data.

FIG. 10B follows the same basic structure of encoding alpha as used to encode RGB, the primary difference is that only the alpha values are compared and color data is ignored during this encoding, also of note is the alpha encoder may run length encode (RLE) the contents of the alpha raster segments to reduce the size of the alpha delta encoded payload as seen in step 1085.

Other data formats and color formats may be encoded in a similar manner as RGB data. In particular, segments of different data may be detected in a selected raster for any data format. The resulting segments may comprise the data that differs and in some embodiments a limited run of pixels in the raster (and adjacent to the changed pixels in the raster) that are the same. The raster segments may then be applied to the payload and a copy of a current frame maintained on the server.

Some types of data may be encoded in other ways as well. The color data stored in the raster segment payloads can be compressed using other compression techniques or algorithms. For example, alpha data may be run length encoded (RLE) within the raster segment. RLE includes specifying a raster number, X location, length of pixels and a single alpha value. The alpha values for that run length will all be set to the particular alpha value. Alpha values often have the same data value or very little fluctuation over an entire raster. Thus, RLE can be more efficient that encoding a length of alpha values that have the same or similar values.

FIG. 11 is an example of a format of a payload sent to client 130 by a server 110. Payload 1100 includes a header 1110, motion payload 1120, cache payload 1130, RGB payload 1140, alpha payload 1150, and end of frame payload 1160. Header 1110 includes general information about the entire payload. For example, the header may include payload size, version and check sum information. The header may also indicate a number of payloads sent and/or where the present payload exists within those payloads. For example, a header may indicate that the current payload is a second of seven payloads sent or that it is the last payload of seven sent payloads. Header 1110 may contain continuity information to allow the decoder to detect lost payloads. Header 1110 may also include flags indicating whether data for the motion, cache, RGB and alpha portions of that payload are included. In some embodiments, a flag is set for each payload portion which contains data in the present payload. For example, if a payload header contained a motion payload flag and RGB payload flag set to true and cache payload flag and alpha payload flag set to false, then the motion and RGB portions of the payload would be expected to contain data and the cache and alpha payload portions would not be expected to contain data or to even be present in the payload Motion payload 1120 may include motion vector data. In particular, motion payload 1120 may indicate the number of commands contained in the motion payload and data for each motion command. Each motion command may indicate a rectangle (or some other shape) and a vector or measure of movement. The rectangles may indicate a location and shape of a rectangle, such as a coordinate point, width and height. The vector may indicate a direction of movement for that particular rectangle, a number of pixels the object has moved, a new location for the origin pixel, or some other indication of motion. For example, the motion vector may include data of "−10" pixels, "20 pixels down" or some other expression for indicating a distance and direction, a new origin coordinate of (20, 15), or some other data.

Cache payload 1130 may include commands for setting a particular common key frame cached at the client as a current frame. In some embodiments, a cache payload is exclusive of a motion payload; if a motion payload is included in a payload, a cache payload is not. Examples of cache commands included in a cache payload include commands to set a common key frame cache ID number at a client and commands to apply a color fill with a particular value at a client. A command to perform a color fill in a particular background may be useful when a background has a relatively uniform color.

RGB payload 1140 provides data regarding pixel red-green-blue data. In particular, an RGB payload may indicate the number of rasters for which data is provided in the payload, the number of raster segments within each raster, a Y location (raster location) and number of segments within the Y location, an X location and length of each segment and a pixel data in RGB format for each pixel of a segment. The pixel data may indicate new pixel data to apply to the current frame or cached frame.

Alpha payload 1150 contains data in a format similar to the RGB payload format with the number of rasters in the payload, the raster number, the number of raster segments for the raster, an X location and length for each segment, and alpha pixel data for each pixel in each segment. The alpha payload may also optionally include an indication, for example a flag, as to whether the alpha payload is run length encoded.

End of Frame payload 1160 may indicate the payload is the last payload needed to fully realize a frame update. When an End_of_frame flag is set, the payload may provide data regarding a shape or bounding rectangle to indicate to UI decoder 131 the area of the frame which has changed and needs updating on the display device.

Client Receipt and Processing of Payload

Thin client 130 may receive the payload transmitted by server 110. Once received, the payload may be passed to UI decoder 131 and parsed to retrieve encoded commands, frame data and other graphical update data. The commands are then executed in a particular order to render a new frame at the client. The new frame is rendered by updating a current frame or cached frame at the client with graphical updates contained in the payload (cache, motion and delta commands). The rendered frame is then presented through a display device at client 130.

Figure 12:
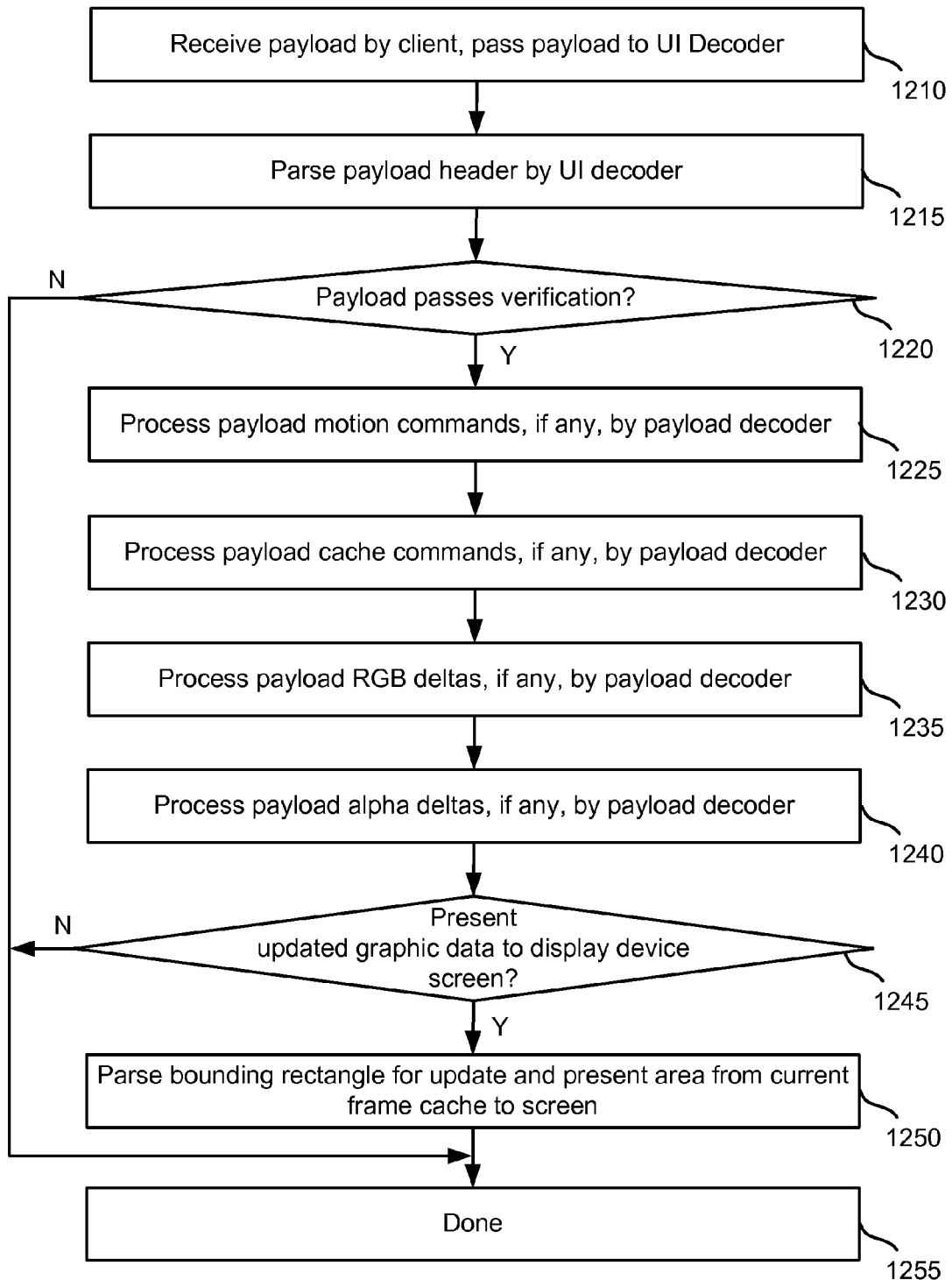
FIG. 12 is a flowchart of an embodiment of a method for performing decoder logic on a client.

FIG. 12 is a flowchart of an embodiment of a method for performing decoder logic on a client. A payload is received by client 130 and passed to UI decoder 132 on the client at step 1210. The payload header is then parsed by UI decoder 131 at step 1215. As illustrated in FIG. 11, payload header 1110 of a payload 1100 may include size, version, checksum, sub-payload portion flags, and indication of whether the current payload is the last of several payloads, and optionally other data. After parsing the payload header, a determination is made as to whether the payload passes verification at step 1220. Payload verification may include determining whether the actual payload size matches an indicated payload size and confirming checksum data. Verifying a payload is discussed in more detail below with respect to FIG. 13. If a payload fails verification, then the client encoding process does not process the payload any further and does not provide updated graphical data in the form of a new frame. Rather, the method ends at step 1255.

If a payload passes verification, any payload motion commands contained in motion payload 1120 are processed at step 1225. The motion commands may include a list of rectangle data (or other shape data) and a vector indicating where to move each rectangle. In some embodiments a payload may not contain any motion commands, such as if a payload contains cache payload 1130. Processing payload motion commands by payload decoder 132 is discussed in more detail below with respect to the method of FIG. 14.

Any payload common key frame cache ID commands contained in cache payload 1130 are processed at step 1230. Common key frame cache commands may include providing a common key frame cache ID for the payload decoder or to select a color fill value for a frame. Common key frame cache commands will not be included in a payload that includes motion commands, and vice versa. Processing payload common key frame cache commands by payload decoder 132 is discussed in more detail below with respect to the method of FIG. 17.

Payload RGB delta encode commands contained in RGB payload 1140 are processed at step 1235. RGB delta encode commands may include a raster and X location to encode in an frame and color value data to copy to the frame. The encode RGB delta commands will be applied to a current frame. Processing payload RGB delta encode commands by payload decoder 132 is discussed in more detail below with respect to the method of FIG. 18.

Alpha payload commands in alpha payload 1150, if any, are processed at step 1240. Alpha delta encode commands may include a raster, X location and alpha value data to copy to the frame. In some embodiments, RLE alpha values may be decoded from alpha payload 1150. Similar to RGB encode commands, alpha encode commands will be applied to the current frame. Processing payload alpha commands by payload decoder 132 is discussed in more detail below with respect to the method of FIG. 19.

After processing a payload, a determination is made as to whether or not to present the updated graphic to display device screen at step 1245. In one embodiment, an update from a current frame to a new frame may be specified over several payloads. The last payload of the several payloads may indicate that it is the latest payload. For example, header 1110 of payload 1100 may include a flag or other data indicating that is a "last payload." In this embodiment, the UI decoder will determine to present the updated graphic to a display device screen if the most recently received payload included a flag which was set to indicate that the payload was the last payload. If the updated graphic data is not to be presented, the method of FIG. 12 is complete. If the updated graphic data is to be presented, a bounding shape or rectangle containing graphical updates is parsed and the area from the current cache frame is presented to the display device at step 1250. The method then ends at step 1255.

Figure 13:
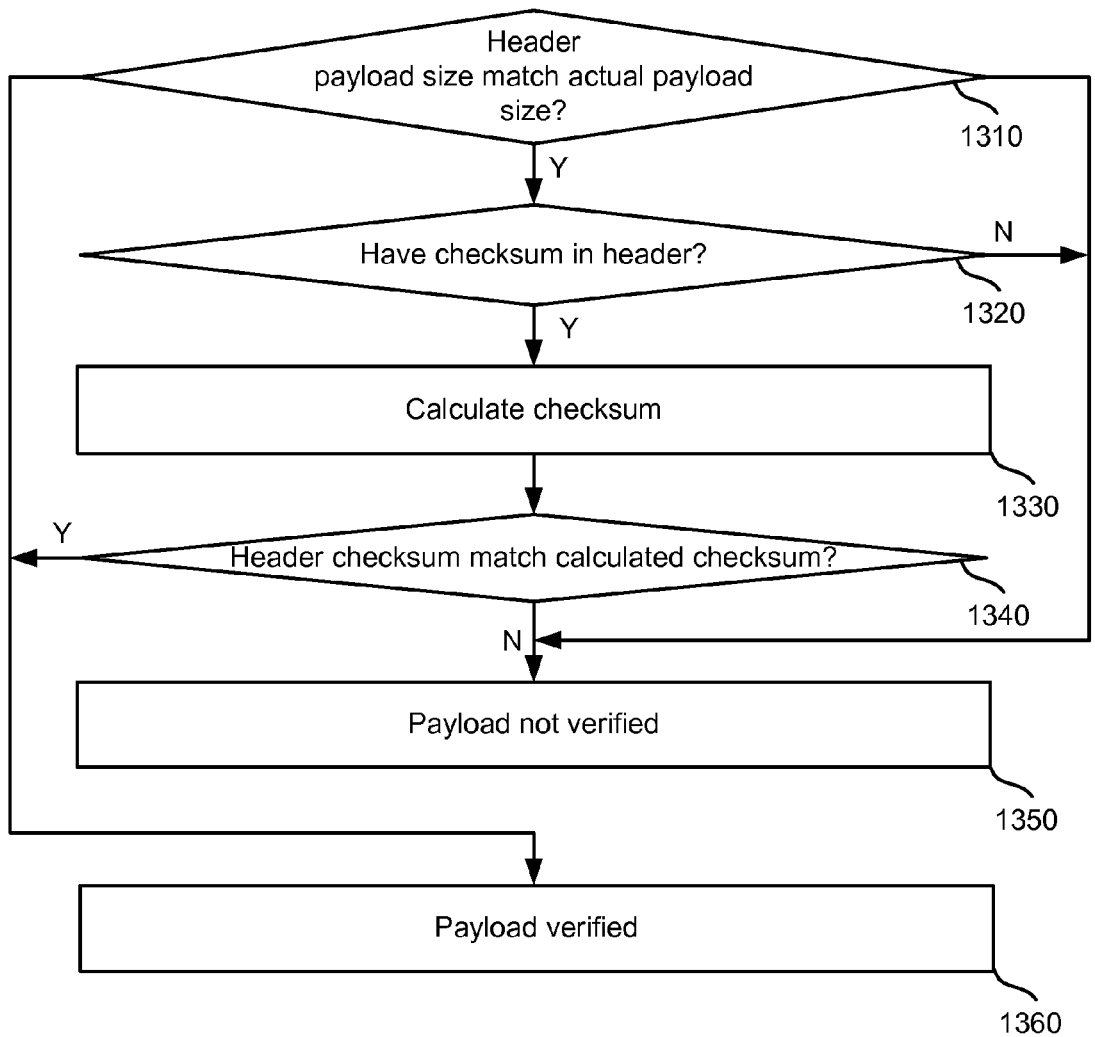
FIG. 13 is a flowchart of an embodiment of a method for verifying a payload.

FIG. 13 is a flowchart of an embodiment of a method for verifying a payload. In some embodiments, the method of FIG. 13 provides more detail for step 1220 of the method of FIG. 12. First, a determination is made as to whether the actual payload size matches a payload size indicated in header 1110 of the payload. If the actual size and indicated size of the payload do not match, the payload fails verification at step 1360. If the actual size and indicated size of the payload match, a determination is made as to whether a checksum is contained in the header. If the checksum is not contained in the header, a checksum comparison is not performed and the payload is determined to pass the verification at step 1350. In some embodiments, a payload may be considered to fail verification if the payload does not contain a checksum. In other embodiments, the checksum may only be used as a testing mechanism If the checksum is contained in the header (or elsewhere in the payload), the checksum of the payload is calculated at step 1330. A determination is then made as to whether the calculated checksum matches the indicated checksum at step 1340. If the checksums match, the payload passes verification at step 1350. If the checksums do not match, the payload fails verification at step 1360.

Figure 14:
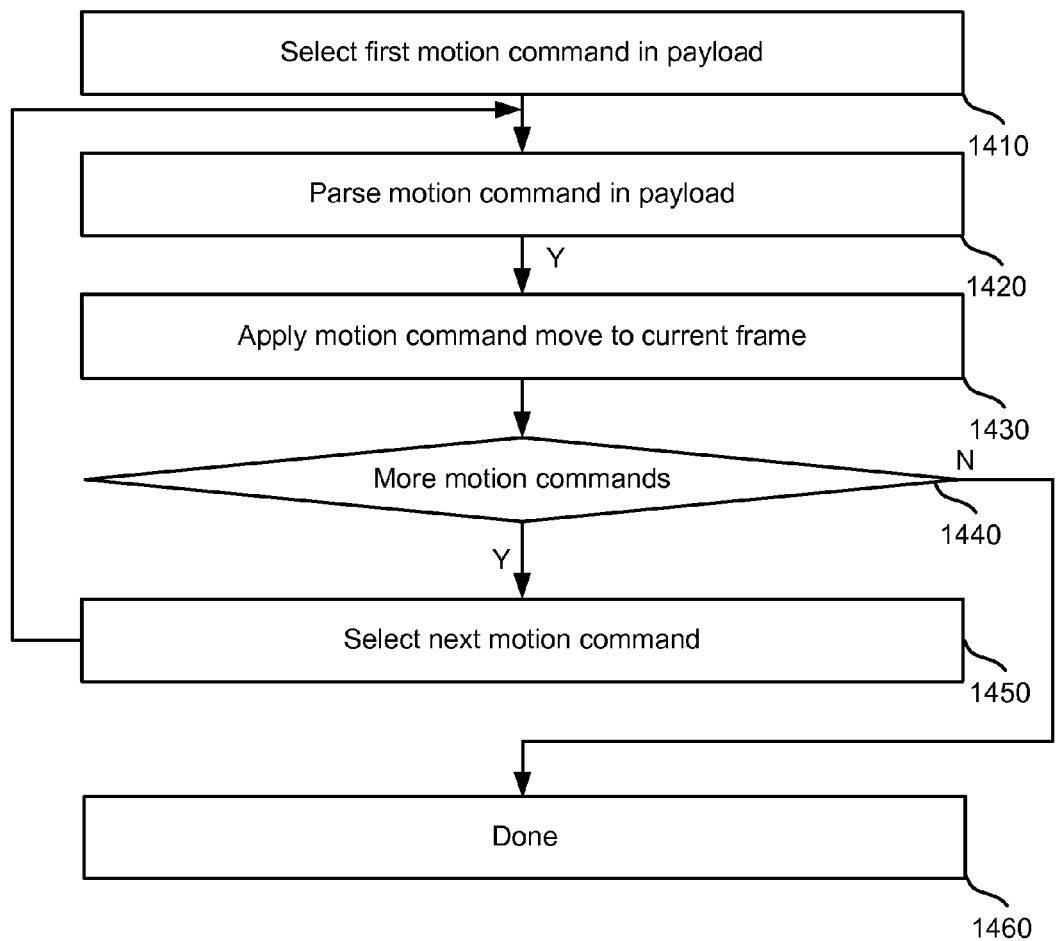
FIG. 14 is a flowchart of an embodiment of a method for processing payload motion commands.

FIG. 14 is a flowchart of an embodiment of a method for processing payload motion commands. In some embodiments, the method of FIG. 14 provides more detail for step 1225 of the method of FIG. 12. First, a first motion command is selected in the payload by payload decoder 132 at step 1420. The motion commands are selected from motion payload 1120. The selected motion command is then parsed at step 1420. The parsing determines the rectangle and vector which comprise the motion command. The parsed motion command is then applied to the current frame at step 1430. Applying the motion command results in copying a rectangle (or other shape) from a first position in a current frame and applying the copy to a second position in a current frame, such as the resulting frame illustrated in the center frame of FIG. 8C. After applying the selected motion command, a determination is made as to whether more motion commands exist in the motion payload at step 1430. If no additional motion commands exist in a payload, processing of payload motion commands is complete at step 1450. If additional motion commands exist in the payload, the next motion command is selected at step 1450 and the method returns to step 1420 to parse the selected motion command.

As discussed above, the present technology may accelerate remote user interface rendering through caching. Caching at the client may be implemented in an efficient manner by configuring use of a frame buffer as a virtual cache and using pointers to indicate which cached frame is a current frame. FIGS. 15A and 15B are examples of managing a frame cache with a frame buffer. As illustrated in FIG. 15A, a frame buffer contains a frame of "A" while a frame cache contains three frames of A, B and C. As a graphical update to the current frame is required, for example an update from frame of A to frame of B as illustrated in FIG. 15B, data comprising the B frame is copied into the frame buffer from the frame cache. Copying a frame from a cache into a frame buffer uses precious CPU processing resources and inefficiently requires some duplication of stored data at the client.

In some embodiments of the present technology, frames may be cached using a virtual frame cache. FIGS. 16A and 16B are examples of configuring a frame buffer as a virtual frame cache. A frame pointer may be used to indicate which portion of a frame cache or virtual frame cache (formerly a frame buffer) contains the current frame to be displayed in the user interface. In FIG. 16A, the current frame pointer is set to the address of frame of A within the virtual frame cache. In FIG. 16B, the current frame pointer is set to the address of frame D within the frame cache. Utilizing a frame buffer as a virtual frame cache and a current frame pointer to identify the location of a cached current frame allows for quicker access to a larger size frame cache. This "zero copy cache" method also effectively provides one additional cache frame over the previous method using the same amount of memory storage, since there is no duplication of the current cache frame.

Figure 17:
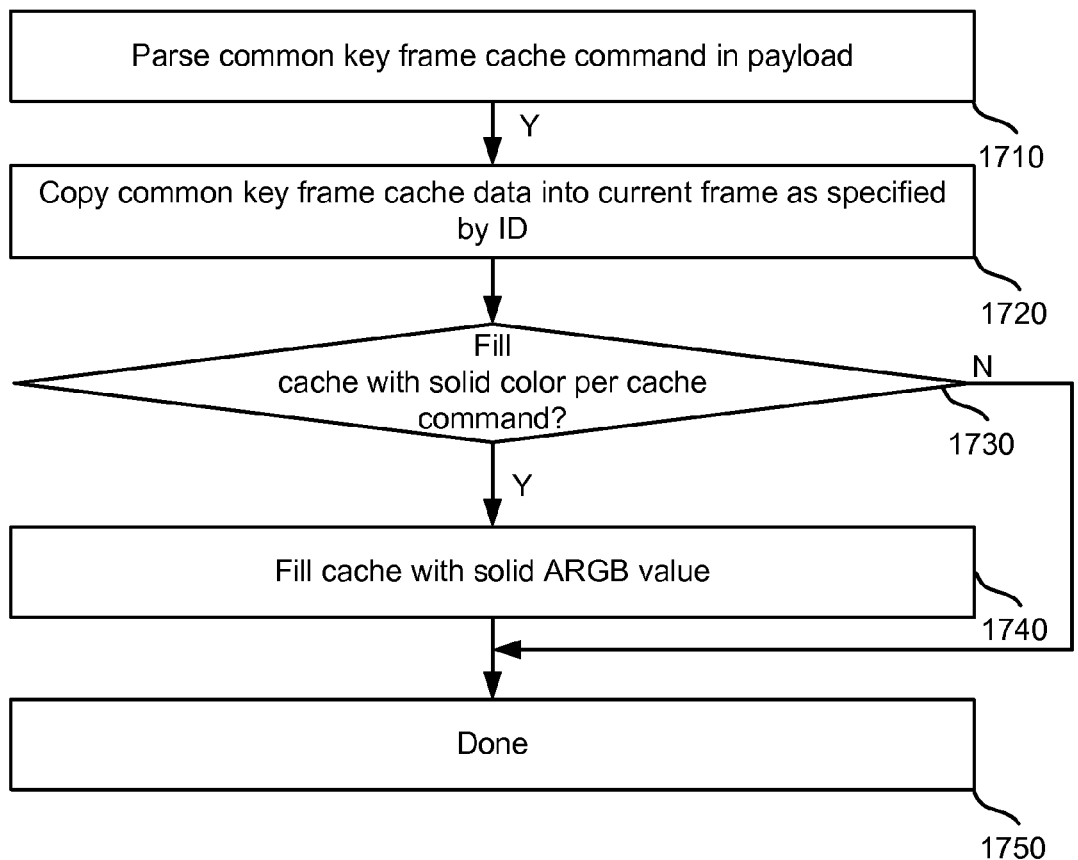
FIG. 17 is a flowchart of an embodiment of a method for processing payload common key frame cache commands.

FIG. 17 is a flowchart of an embodiment of a method for processing payload common key frame cache commands. In some embodiments, the method of FIG. 17 provides more detail for step 1230 of the method of FIG. 12. First, a common key frame cache command is parsed in a cache payload portion of payload 1100 at step 1710.

Common key frame cache data is copied into the current frame as specified by the cache ID at step 1720. The selected cache ID corresponds to a cache ID contained in the parsed cache command. A copy from the common key cache to the current frame is required with common key frame caching when using a zero copy cache mechanism to prevent changing the cached frame during rendering. A determination is then made as to whether to fill the current cached frame with solid color as instructed by the cache command at step 1730. As discussed above, delta encoder 119 may encode a color fill command if the cache logic detects a constant color fill command should be generated. If the cache command portion of the payload includes a color fill command, the current cache frame is filled as indicated by the corresponding fill data at step 1740 and the method is complete at step 1750. If the cache command does not include color fill data, the current cache frame is not filled and the method is complete at step 1750.

Figure 18:
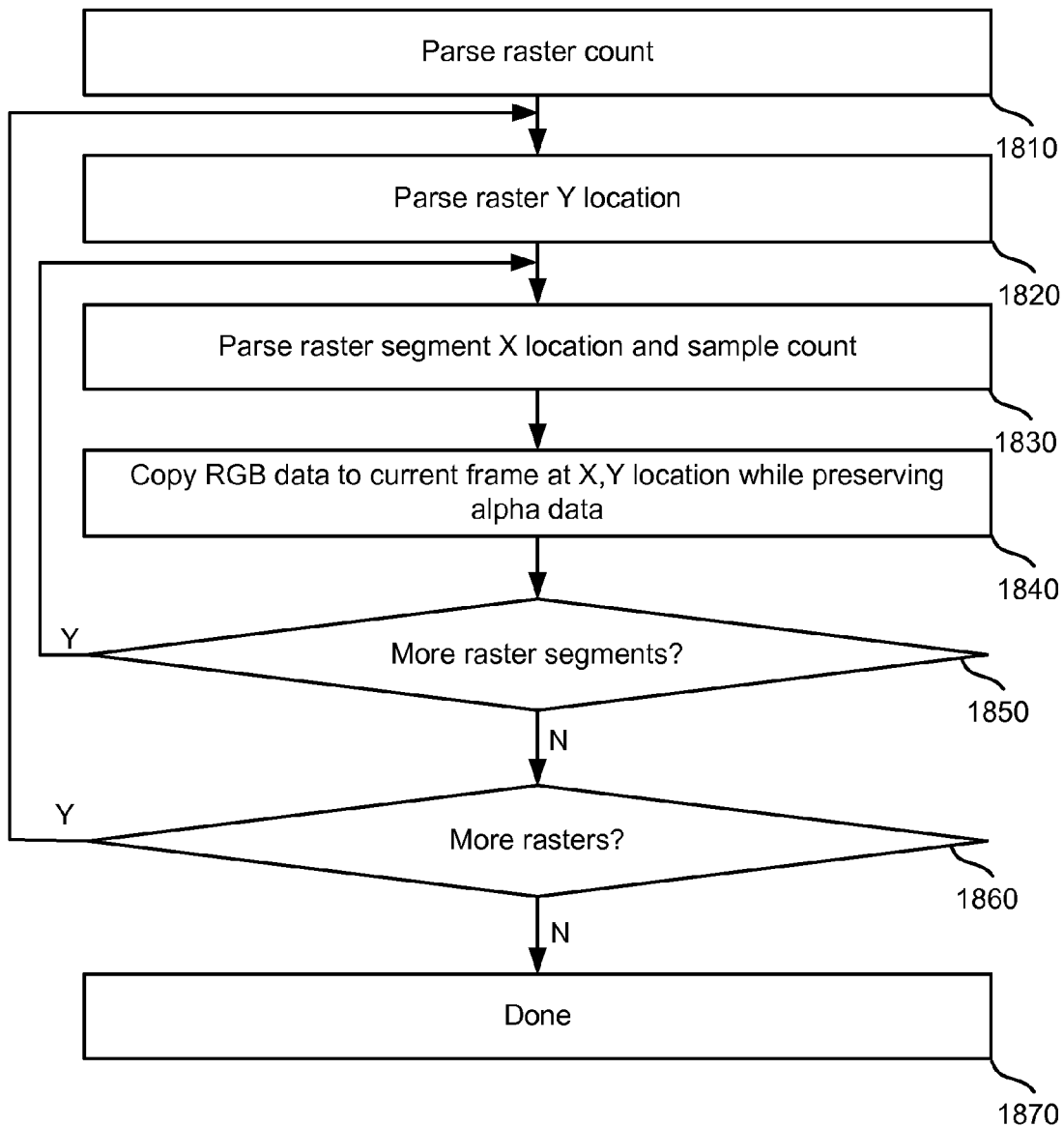
FIG. 18 is a flowchart of an embodiment of a method for processing payload RGB delta commands.

FIG. 18 is a flowchart of an embodiment of a method for processing payload RGB delta commands. In some embodiments, the method of FIG. 18 provides more detail for step 1235 of the method of FIG. 12. A raster count is first parsed at step 1810 and raster Y location is parsed at step 1820. The raster segment X location and sample count is then parsed at step 1830 and the RGB data encoded in the delta payload is copied to the current cache frame at the indicated X,Y position at step 1840. The alpha data for the updated pixels is preserved (unchanged) while the RGB data is copied into the current frame. After copying the RGB data, a determination is made as to whether any more raster segments exist to be parsed at step 1850. If more raster segments exist to be parsed, the method returns to step 1850 where the next raster segment is selected and parsed. If no more raster segments exist to be parsed in the current raster, a determination is made as to whether any more rasters exist to be parsed at step 1860. If no more rasters exist to be parsed, processing of RGB delta commands in the payload is complete at step 1870. If more rasters exist to be parsed, the method returns to step 1820 wherein the next raster is selected and the raster data is parsed.

Figure 19:
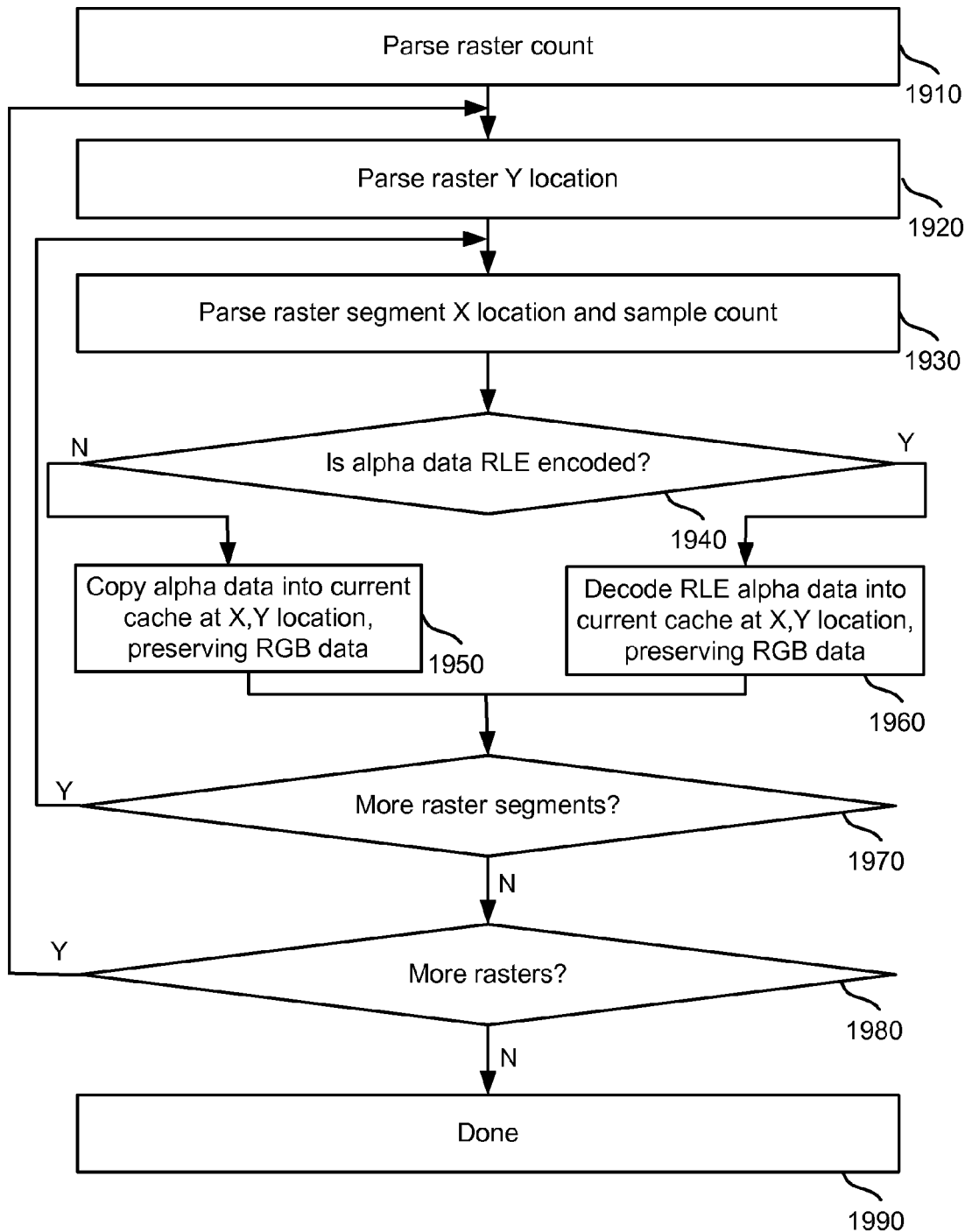
FIG. 19 is a flowchart of an embodiment of a method for processing payload alpha delta commands.

FIG. 19 is a flowchart of an embodiment of a method for processing payload alpha delta commands. In some embodiments, the method of FIG. 19 provides more detail for step 1240 of the method of FIG. 12. A raster count is first parsed at step 1910, the raster Y location is then parsed at step 1920, and a raster segment X location and sample count is parsed at step 1930. A determination is then made as to whether the alpha data is RLE encoded at step 1940. As discussed above, the alpha payload may have a flag or some other indication that the alpha data may be run length encoded rather than segment encoded to more efficiently encode alpha data having the same or similar values. If the alpha data is run length encoded, the RLE alpha data is decoded into the current cache at the determined X, Y location for the length indicated. While decoding the RLE alpha data, the RGB data values are preserved (not changed). If the alpha data is not run length encoded, the alpha data is encoded into the current cache in raster segments similar to how RGB data is encoded or copied into the current cache frame. After raster segment alpha data or RLE alpha data is decoded into the cache, a determination is made as to whether more raster segments (or RLE encodings) exist for the raster at step 1970. If more raster segments exist, the next segment is selected and the raster segment is parsed at step 1930. If more raster segments do not exist, a determination is made as to whether more rasters exist to be processed. If more rasters exist, the next raster is selected and the raster is parsed at step 1920. If more rasters do not exist, the method is complete at step 1990.

Figure 20:
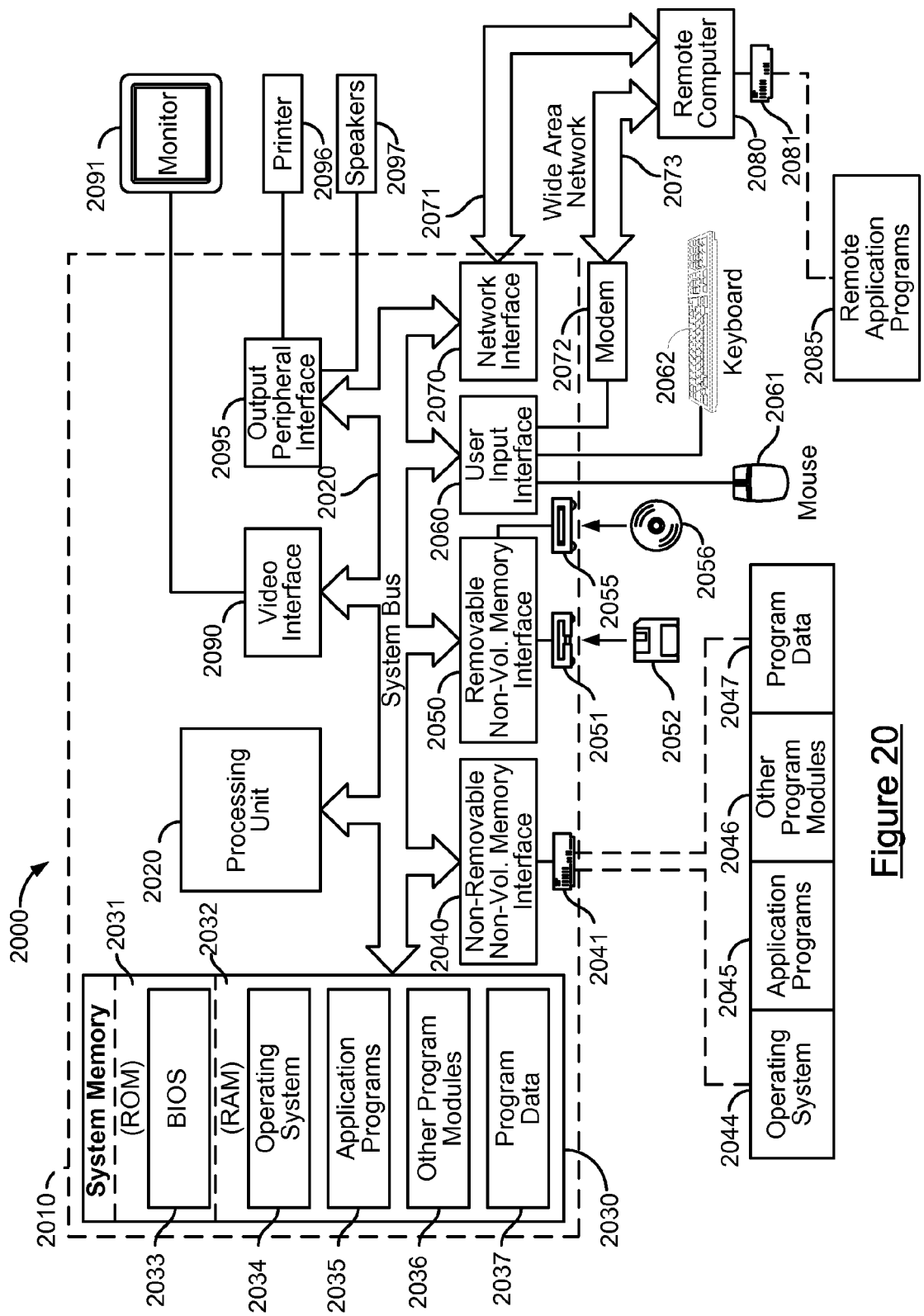
FIG. 20 is a block diagram of an embodiment of a computing environment for implementing the present technology.

FIG. 20 is a block diagram for an embodiment of a computing environment for implementing the present technology. In some embodiments, the computing environment of FIG. 20 may be used to implement server 110 and client 130 of the system of FIG. 1A.

Computing environment 2000 of FIG. 20 is only one example of a suitable computing environment and is not intended to suggest any limitation as to the scope of use or functionality of the technology herein. Neither should the computing environment 2000 be interpreted as having any dependency or requirement relating to any one or combination of components illustrated in the exemplary operating environment 2000.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 20, an exemplary system for implementing the technology herein includes a general purpose computing device in the form of a computer 2010. Components of computer 2010 may include, but are not limited to, a processing unit 2020, a system memory 2030, and a system bus 2021 that couples various system components including the system memory to the processing unit 2020. The system bus 2021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2010 typically includes a variety of computer readable media. Computer readable media can be any available media that can be accessed by computer 2010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 2030 includes computer storage media in the form of volatile and/or nonvolatile memory such as read only memory (ROM) 2031 and random access memory (RAM) 2032. A basic input/output system 2033 (BIOS), containing the basic routines that help to transfer information between elements within computer 2010, such as during start-up, is typically stored in ROM 2031. RAM 2032 typically contains data and/or program modules that are immediately accessible to and/or presently being operated on by processing unit 2020. By way of example, and not limitation, FIG. 20 illustrates operating system 2034, application programs 2035, other program modules 2036, and program data 2037.

The computer 2010 may also include other removable/non-removable, volatile/nonvolatile computer storage media. By way of example only, FIG. 20 illustrates a hard disk drive 2040 that reads from or writes to non-removable, nonvolatile magnetic media, a magnetic disk drive 2051 that reads from or writes to a removable, nonvolatile magnetic disk 2052, and an optical disk drive 2055 that reads from or writes to a removable, nonvolatile optical disk 2056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2041 is typically connected to the system bus 2021 through a non-removable memory interface such as interface 2040, and magnetic disk drive 2051 and optical disk drive 2055 are typically connected to the system bus 2021 by a removable memory interface, such as interface 2050.

The drives and their associated computer storage media discussed above and illustrated in FIG. 20, provide storage of computer readable instructions, data structures, program modules and other data for the computer 2010. In FIG. 20, for example, hard disk drive 2041 is illustrated as storing operating system 2044, application programs 2045, other program modules 2046, and program data 2047. Note that these components can either be the same as or different from operating system 2034, application programs 2035, other program modules 2036, and program data 2037. Operating system 2044, application programs 2045, other program modules 2046, and program data 2047 are given different numbers here to illustrate that, at a minimum, they are different copies. A user may enter commands and information into the computer 200 through input devices such as a keyboard 2062 and pointing device 2061, commonly referred to as a mouse, trackball or touch pad. Other input devices (not shown) may include a microphone, joystick, game pad, satellite dish, scanner, or the like. These and other input devices are often connected to the processing unit 2020 through a user input interface 2060 that is coupled to the system bus, but may be connected by other interface and bus structures, such as a parallel port, game port or a universal serial bus (USB). A monitor 2091 or other type of display device is also connected to the system bus 2021 via an interface, such as a video interface 2090. In addition to the monitor, computers may also include other peripheral output devices such as speakers 2097 and printer 2096, which may be connected through an output peripheral interface 2090.

The computer 2010 may operate in a networked environment using logical connections to one or more remote computers, such as a remote computer 2080. The remote computer 2080 may be a personal computer, a server, a router, a network PC, a peer device or other common network node, and typically includes many or all of the elements described above relative to the computer 2010, although only a memory storage device 2081 has been illustrated in FIG. 20. The logical connections depicted in FIG. 20 include a local area network (LAN) 2071 and a wide area network (WAN) 2073, but may also include other networks. Such networking environments are commonplace in offices, enterprise-wide computer networks, intranets and the Internet.

When used in a LAN networking environment, the computer 2010 is connected to the LAN 2071 through a network interface or adapter 2070. When used in a WAN networking environment, the computer 2010 typically includes a modem 2072 or other means for establishing communications over the WAN 2073, such as the Internet. The modem 2072, which may be internal or external, may be connected to the system bus 2021 via the user input interface 2060, or other appropriate mechanism. In a networked environment, program modules depicted relative to the computer 2010, or portions thereof, may be stored in the remote memory storage device. By way of example, and not limitation, FIG. 20 illustrates remote application programs 2085 as residing on memory device 2081. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for managing a cache, comprising:
   providing a plurality of common key frames of graphical information to a client by a server;
   providing current graphical frame data for a current frame to a client by a server over a network, the current graphical frame data identifies a first of the common key frames to be used to render the current frame;
   receiving a command from the client at the server after providing the current graphical frame data;
   identifying a new frame by the server to be rendered at the client based on the command;

selecting one of the plurality of common key frames by the server for use in rendering the new frame;

determining a set of difference data associated with the difference between the new frame and the selected common key frame; and transmitting an identifier for the selected common key frame and the set of difference data to the client by the server.

2. The method of claim 1, wherein said step of selecting one of the common key frames by the server includes:

receiving an indication that a user interface framework has generated the new frame using a selected frame of the one or more common key frames.

3. The method of claim 1, wherein said step of providing one or more common key frames includes:

providing one or more common key frames during initialization of the client.

4. The method of claim 1, further comprising:

determining that the identified new frame is not associated with a full frame update or that the identified new frame is not associated with a constant color fill.

5. The method of claim 1, wherein said step of providing one or more common key frames by the server includes:

determining the amount of memory available at the client for caching common key frames.

6. The method of claim 1, wherein said step of selecting one of the common key frames by the server includes:

generating a common key frame command with a key frame identifier.

7. The method of claim 6, wherein the key frame command is configured to set a current frame pointer to a common key frame.

8. The method of claim 7, wherein the key frame command is configured to copy a current frame from a frame cache to a current frame buffer.

9. The method of claim 1, wherein said step of determining a set of difference data includes:

comparing pixel data values between pixels in the selected common key frame and the new frame.

10. The method of claim 9 wherein said step of determining a set of difference data includes:

generating instructions to set raster segments in the selected common key frame to a set of pixel data values associated with the new frame.

11. One or more processor readable storage devices having processor readable code embodied on said processor readable storage devices, said processor readable code for programming one or more processors to perform a method comprising:

receiving a set of common key frames containing graphical information by a client from a server;

storing each common key frame at a common key frame cache slot at the client;

rendering a first frame at the client by using a first of the common key frames;

sending a command from the client to the server after rendering the first frame;

receiving a set of instructions by the client from the server in response to the command, the set of instructions including a common key frame instruction and difference data instructions, the difference data instructions are based on differences between a new frame to be presented at the client and a second of the common key frames stored at the client;

setting a first pointer to a selected common key frame cache slot at the client in response to executing the common key frame instruction;

modifying graphical frame data associated with the common key frame slot in response to executing the difference data instructions; and presenting a frame associated with the modified graphical frame data through a display device by the client.

12. The one or more processor readable storage devices of claim 11, wherein the common key frame instruction identifies the common key frame slot at the client to which the first pointer is set.

13. The one or more processor readable storage devices of claim 11, wherein the first pointer may be set to an address associated with client cache memory or a client frame buffer.

14. The one or more processor readable storage devices of claim 13, wherein only one copy of two or more graphical frames of data is stored in a client memory, the client memory including the client cache and client frame buffer.

15. The one or more processor readable storage devices of claim 11, wherein the set of instructions include an instruction to fill the current frame with a color.

16. The one or more processor readable storage devices of claim 11, further comprising:

transmitting memory information by the client to the server, the memory information indicating a portion of memory allocated to store common key frames by the client, to the server, said set of common key frames received from the server configured to be contained within the portion of allocated memory at the client.

17. The one or more processor readable storage devices of claim 11, wherein said step of modifying includes:

applying updates to raster segments in the selected cache slot frame with raster segment data contained in the difference data instructions.

18. A method for managing a cache, comprising:

receiving memory size information from a client by a server;

providing two or more common key frames to a client by a server over a network during initialization of the client, the two or more common key frames are a corresponding two or more backgrounds to be cached at the client;

identifying a first of the two or more common key frames to be rendered at the client for an initial frame;

identifying a new frame by the server to be rendered at the client;

identifying a second of the two or more common key frames to be used to generate the new frame;

generating a common key frame instruction to select the second common key frame at the client;

encoding a set of difference data instructions associated with the difference between the new frame and the second common key frame; and transmitting a payload that includes the common key frame instruction and the set of difference data instructions to the client by the server.

19. The method of claim 18, wherein said step of generating a common key frame instruction includes an instruction to set a client pointer to the first common key frame.

20. The method of claim 18, further comprising:

selecting a common key frame at the server which corresponds to the new frame; and applying the difference data instructions to the common key frame at the server.

* * * * *